(12) United States Patent
Wigren

(10) Patent No.: US 11,486,959 B2
(45) Date of Patent: Nov. 1, 2022

(54) SCALED TDOA 3D POSITIONING

(71) Applicant: Telefonaktiebolaget LM Ericsson (publ), Stockholm (SE)

(72) Inventor: Torbjörn Wigren, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/971,138

(22) PCT Filed: Dec. 11, 2018

(86) PCT No.: PCT/SE2018/051286
§ 371 (c)(1),
(2) Date: Aug. 19, 2020

(87) PCT Pub. No.: WO2019/164432
PCT Pub. Date: Aug. 29, 2019

(65) Prior Publication Data
US 2020/0408872 A1 Dec. 31, 2020

Related U.S. Application Data

(60) Provisional application No. 62/633,287, filed on Feb. 21, 2018.

(51) Int. Cl.
*G01S 5/00* (2006.01)
*G01S 5/10* (2006.01)
(Continued)

(52) U.S. Cl.
CPC ............. *G01S 5/10* (2013.01); *G01S 5/021* (2013.01); *G06F 17/16* (2013.01); *H04W 72/0413* (2013.01)

(58) Field of Classification Search
CPC ............ G01S 5/10; G01S 5/021; G06F 17/16; H04W 72/0413
See application file for complete search history.

(56) References Cited

U.S. PATENT DOCUMENTS 7,203,499 B2   4/2007   Wigren
7,676,232 B2   3/2010   Wigren et al.
(Continued)

FOREIGN PATENT DOCUMENTS

CN   105891775 A   8/2016
CN   107004028 A   8/2017
(Continued)

OTHER PUBLICATIONS

Author Unknown, "Stone-Weierstrass theorem," https://en.wikipedia.org/wiki/Stone-Weierstrass_theorem, accessed Aug. 2020, 7 pages.
(Continued)

*Primary Examiner* — Khai M Nguyen
(74) *Attorney, Agent, or Firm* — Withrow & Terranova, PLLC

(57) ABSTRACT

Systems and methods are disclosed herein that relate to positioning in a cellular communications system. In some embodiments, a method for determining a three dimensional location of a wireless device in a cellular communications network comprises obtaining a plurality of measurements for a wireless device, where the plurality of measurements are Time Difference of Arrival (TDOA) related measurements. The method further comprises computing a three dimensional position of the wireless device using the plurality of measurements and a vertical surface model, wherein the vertical surface model is a translated and scaled version of an initial vertical surface model. The new vertical surface model provides translation and scaling of the initial vertical surface model to a suitable range before it is used to determine the three dimensional position of the wireless device such that accuracy is improved, e.g., in large rural cells.

11 Claims, 18 Drawing Sheets

(51) Int. Cl.
  *G01S 5/02*   (2010.01)
  *G06F 17/16*  (2006.01)
  *H04W 72/04*  (2009.01)

(56) References Cited

U.S. PATENT DOCUMENTS

| | | | |
|---|---|---|---|
| 8,170,582 | B2 | 5/2012 | Wigren |
| 8,600,708 | B1 | 12/2013 | Mallet et al. |
| 8,892,124 | B2 | 11/2014 | Wigren |
| 2005/0080924 | A1 | 4/2005 | Shang et al. |
| 2007/0135089 | A1 | 6/2007 | Edge et al. |
| 2010/0075696 | A1 | 3/2010 | Wigren |
| 2012/0326923 | A1* | 12/2012 | Oehler .............. G01S 5/14 342/464 |
| 2013/0030931 | A1 | 1/2013 | Moshfeghi |
| 2013/0210458 | A1* | 8/2013 | Wigren .............. G01S 5/0252 455/456.1 |
| 2013/0337767 | A1 | 12/2013 | Siomina et al. |
| 2020/0241106 | A1 | 7/2020 | Shu et al. |

FOREIGN PATENT DOCUMENTS

| | | | | |
|---|---|---|---|---|
| EP | 2200371 | A2 | 6/2010 | |
| EP | 1454163 | B1 * | 5/2012 | ............ G01S 13/84 |
| WO | 2003065253 | A2 | 8/2003 | |
| WO | 2007043915 | A1 | 4/2007 | |
| WO | 2008118052 | A1 | 10/2008 | |
| WO | 2010069614 | A1 | 6/2010 | |
| WO | 2012060753 | A1 | 5/2012 | |
| WO | 2012080791 | A1 | 6/2012 | |
| WO | 2019164431 | A1 | 8/2019 | |

OTHER PUBLICATIONS

Author Unknown, "Technical Specification Group Services and System Aspects; Universal Geographical Area Description (GAD) (Release 14)," 3GPP TS 23.032, Version 14.0.0, 3rd Generation Partnership Project, Mar. 2017, 29 pages.
Caunchy, A.-L., "Sur la mécanique céleste et sur un nouveau calcul qui s'applique à un grande nombre de questions diverses," Presented to Academy of Science of Turin, Turin, Oct. 11, 1831, 18 pages.
Churchill, R. V., et al., "Complex Variables and Applications," Third Edition, 1974, McGraw-Hill, Inc., 342 pages.
Rudin, W., "Principles of Mathematical Analysis," Third Edition, 1976, McGraw-Hill, Inc., 352 pages.
Stone, M. H., "The Generalized Weierstrass Approximation Theorem," Mathematics Magazine, vol. 21, No. 4, Mar.-Apr. 1948, Mathematical Association of America, pp. 167-184.
Weierstrass, K., "Über die analytische Darstellbarkeit sogenannterwillkürlicher Functionen einer reellen Veränderlichen," Sitzungsberichteder Königlich Preussischen Akademie der Wissenschaften zu Berlin, 1885, ErsteMitteilung (part 1) pp. 633-639, Zweite Mitteilung (part 2) pp. 789-805.
Wigren, T., "LTE Fingerprinting Localization with Altitude," 2012 IEEE Vehicular Technology Conference (VTC Fall), Sep. 3-6, 2012, IEEE, 5 pages.
International Search Report and Written Opinion for International Patent Application No. PCT/SE2018/051285, dated Mar. 14, 2019, 8 pages.
International Search Report and Written Opinion for International Patent Application No. PCT/SE2018/051286, dated Feb. 14, 2019, 10 pages.
Final Office Action for U.S. Appl. No. 16/971,096, dated Jan. 6, 2022, 22 pages.
Non-Final Office Action for U.S. Appl. No. 16/971,096, dated Sep. 21, 2021, 18 pages.
First Office Action for Chinese Patent Application No. 201880090103.8, dated Dec. 3, 2021, 18 pages.
Wigren, T., "Wireless Hybrid Positioning Based on Surface Modeling with Polygon Support," Vehicular Technology Conference, Jun. 2018, Porto, Portugal, IEEE, 7 pages.
Advisory Action and Applicant-Initiated Interview Summary for U.S. Appl. No. 16/971,096, dated Mar. 14, 2022, 3 pages.
Non-Final Office Action and Examiner-Initiated Interview Summary for U.S. Appl. No. 16/971,096, dated May 31, 2022, 27 pages.
Notification to Grant for Chinese Patent Application No. 201880090103.8, dated Jun. 17, 2022, 7 pages.
Examination Report for European Patent Application No. 18830324.2, dated Apr. 21, 2022, 6 pages.

* cited by examiner

| 8 | 7 | 6 | 5 | 4 | 3 | 2 | 1 | |
|---|---|---|---|---|---|---|---|---|
| 0 | 1 | 0 | 1 | \multicolumn{4}{c|}{NUMBER OF POINTS} | OCTET 1 |

| | |
|---|---|
| S1 | OCTET 2 |
| DEGREES OF LATITUDE OF POINT 1 | OCTET 3 |
| | OCTET 4 |
| | OCTET 5 |
| DEGREES OF LONGITUDE OF POINT 1 | OCTET 6 |
| | OCTET 7 |
| ⋮ | |
| Sn | OCTET 6n-4 |
| DEGREES OF LATITUDE OF POINT n | OCTET 6n-3 |
| | OCTET 6n-2 |
| | OCTET 6n-1 |
| DEGREES OF LONGITUDE OF POINT n | OCTET 6n |
| | OCTET 6n+1 |

*FIG. 5*

SCALED TDOA 3D POSITIONING

RELATED APPLICATIONS

This application is a 35 U.S.C. § 371 national phase filing of International Application No. PCT/SE2018/051286, filed Dec. 11, 2018, which claims the benefit of provisional patent application Ser. No. 62/633,287, filed Feb. 21, 2018, the disclosures of which are hereby incorporated herein by reference in their entireties.

TECHNICAL FIELD

The present disclosure relates to wireless device positioning in a cellular communications network.

BACKGROUND

Since the standardization of Fifth Generation (5G) positioning technology has not been finalized, the Long Term Evolution (LTE) system is used to describe the conventional technology and some of the solutions. The solutions for 5G are expected to be similar, and the present description should therefore not be seen as a limitation to the Fourth Generation (4G) LTE systems.

I. New Federal Communications Commission (FCC) Requirements and Need for Time Difference of Arrival (TDOA) Positioning To understand the background of the present disclosure, the new E-911 positioning requirements mandated by the US FCC needs to be reviewed. The FCC E-911 emergency positioning requirements mandate the positioning performance that must be met by cellular operators in the US. To account for the increased amount of cellular indoor traffic, the FCC tightened its requirements in February 2015 to specify:
  A 50 meter horizontal accuracy must be provided for 40%, 50%, 70%, and 80% of all emergency calls within two, three, five, and six years, respectively.
  For vertical positioning performance, operators should propose an accuracy metric within three years to be approved by the FCC. Operators need to comply with the metric within six years. To facilitate an enhanced vertical accuracy, all services must make uncompensated barometric data available from any handset that has the capability to deliver barometric sensor data.
  The response time shall be less than 30 seconds after the E-911 call is placed for 90% of all calls.
  Support for barometric measurement reporting was introduced in the LTE 4G cellular system, Release 14. It needs to be kept in mind that originally the vertical accuracy requirement discussions driven by the FCC called for a vertical inaccuracy of less than three meters for the majority of the E-911 positioning attempts. Since the final values are yet unknown, the three meter requirement is kept here as a working assumption. The underlying reason for the three meter requirement is the need to point out the floor of the user when inside tall buildings.

One may ask why there is a need for TDOA positioning, due to the wide-spread availability of Global Positioning System (GPS) receivers in cell phones today. The reasons include, e.g., the fact that satellite based positioning like GPS and Assisted GPS (A-GPS) has very poor availability indoors; then, e.g., E-911 positioning requires other high precision methods. Only TDOA based positioning methods have this high-precision potential. Secondly, in case of lawful intercept, terrorists and other criminal elements may very well turn off satellite based positioning services to avoid interception. However, when their phones stay on, the cellular network may obtain their positions by application of TDOA based positioning.

II. Positioning Technology Overview

A. Positioning Architecture of LTE

Since 5G positioning standardization is not close to finalization at the time of writing of the present disclosure, the positioning architecture of the LTE system is briefly reviewed here. The positioning architecture is believed to become similar in the 5G cellular systems that are currently being standardized.

The three important network elements in any positioning architecture are the Location Service (LCS) client, the LCS target, and the LCS server. The LCS server is a physical or logical entity managing positioning for a LCS target device by obtaining measurements and other location information, providing assistance data to assist User Equipment devices (UEs) in measurements, and computing or verifying the final position estimate. A LCS client is a software and/or hardware entity that interacts with a LCS server for the purpose of obtaining location information for one or more LCS targets, i.e. the entities being positioned. LCS clients may reside in the LCS targets themselves. LCS clients subscribe to LCS to obtain location information, and LCS servers process and serve the received requests and send the positioning result, e.g., to the LCS target. Depending on the positioning method, a location may be obtained based on radio signals received by and/or transmitted from the LCS target. The radio signals transmitted from the LCS target are typically received by enhanced or evolved Node Bs (eNBs), and the radio signals received by the LCS target are typically transmitted from eNBs or satellites. However, to further enhance the positioning methods based on radio signals received by the LCS target, an additional Terrestrial Beacon System (TBS) may be deployed. The TBS consists of a network of ground-based transmitters, broadcasting signals only for positioning purposes. The signals comprise the non-LTE Metropolitan Beacon System (MBS) signals, as well as the LTE Positioning Reference Signals (PRSs), these signals corresponding to two different beacon types. To enhance positioning methods based on radio signals transmitted from the LCS target, additional Location Measurement Units (LMUs) may be deployed in a standalone manner. The LMUs may also be co-located with or integrated into eNBs. The purpose of the LMUs is to perform measurements on uplink radio signals transmitted by the LCS target and to report the measurements to the LCS server.

In LTE Release 9, two new protocols were standardized specifically to support positioning, the LTE Positioning Protocol (LPP) and the LTE Positioning Protocol Annex (LPPa). The LPP is a point-to-point protocol between a LCS server and a LCS target device, used in order to position the target device. The following transactions have been specified: capability transfer procedure (request/provide messages), assistance data transfer procedure (request/provide messages), and alocation information transfer procedure (request/provide messages). Multiple LPP procedures of any of the aforementioned types can be used in series and/or in parallel. LPP is used both by control plane and user plane positioning solutions. LPPa is specified only for control plane positioning procedures. However, with the user plane and the control plane interworking, LPPa can also assist the user plane solution by querying eNBs for information and eNB measurements not related to a UE connection. Another positioning protocol, SLmAP, over the SLm interface between the LMU and the LCS server was introduced in LTE Release 11 to support Uplink TDOA (U-TDOA).

To support LCS, at least two functional nodes must be present in the LTE control plane architecture: the Evolved Serving Mobile Location Center (E-SMLC), which controls the coordination and scheduling of the resources required to locate the mobile device, and the Gateway Mobile Location Center (GMLC), which controls the delivery of position data, user authorization, charging, and more. The LPP messages are transmitted transparently to the Mobility Management Entity (MME), using Radio Resource Control (RRC) as a transport over the LTE-Uu interface between the UE and the E-SMLC, using S1-AP over the S1-MME interface, and using LCS Application Protocol (AP) over the SLs interface between the eNB and the E-SMLC. LPPa conducts the LPPa location.

Information transfer procedures for positioning-related information. LPPa is also transparent to the MME which routes the LPPa packets transparently over the S1-MME and SLs interfaces without knowledge of the involved LPPa transaction. The LTE positioning architecture for the control plane is shown in FIG. 1. To describe the operation of the architecture, consider the case where the MME receives a positioning request for some LCS associated with a particular LCS target (e.g., a UE). The MME then sends a LCS request in a LCS-AP Location Request message to an E-SMLC. The E-SMLC processes the location services request to perform a positioning of the target UE. The E-SMLC then returns the result of the location service back to the MME.

In general, Secure User Plane Location (SUPL) supports and complements control plane protocols to enable Location Based Services (LBS) support with the least possible impact on the control plane and the deployed network. The LTE user plane positioning architecture is shown in FIG. 2. SUPL uses established data-bearing channels (i.e., the LTE user plane) and positioning protocols (i.e., LPP) for exchanging the positioning-related data between a LCS target and a LCS server. In the general user plane protocol stack, SUPL occupies the application layer with LPP transported as another layer above SUPL. After establishing a Transmission Control Protocol (TCP)/Internet Protocol (IP) connection and initiating the SUPL and then LPP sessions, the flow of LPP messages can be the same as in the control plane version of LPP, just with the SUPL Enabled Terminal (SET) as the LCS target and the SUPL Location Platform (SLP) as the LCS server. The SLP implements the SUPL Location Center (SLC) and the SUPL Positioning Center (SPC) functions with the latter either being integrated in the E-SMLC or attached to it with a proprietary interface. The SLC system coordinates the operations of SUPL in the network and implements the following SUPL functions as it interacts with the SET over the user plane bearer: privacy function, initiation function, security function, roaming support, charging function, service management, and position calculation. The SPC supports the following SUPL functions: security function, assistance delivery function, SUPL reference retrieval function (e.g., retrieving data from a GPS reference network), and SUPL position calculation function.

B. Air Interface Resource Grid and PRSs

The 4G and 5G air interfaces both employ variants of so called Orthogonal Frequency Division Multiplexing (OFDM) Access (OFDMA) transmission schemes. These schemes operate on a time-frequency grid. In the frequency domain, the bandwidth is divided in so called subcarriers. In the 4G LTE system and at low carrier frequencies (15 kilohertz (kHz) and possibly 30 kHz), subcarrier spacing is used. At the high millimeter wave (mmw) carrier frequencies, the subcarrier spacing may typically be 120 kHz or 240 kHz. In the time domain, the transmission is organized in so called OFDMA symbols. In LTE, there are 14 OFDM symbols in each millisecond (ms), while sub-ms time intervals in the 5G standard also occupy 14 OFDMA symbols. An example part of the time frequency grid of the LTE downlink is depicted in FIG. 3.

FIG. 3 depicts the locations of the PRSs. These signals are known pilot signals upon which the receiver can measure, e.g., Time Of Arrival (TOA). This is of central importance for the present disclosure since the TOAs are the measurements behind the disclosed new positioning methods.

In the LTE uplink, these TOA measurements are instead done on transmitted Sounding Reference Signals (SRSs).

In the 5G system, the definitions of the PRSs are not yet finally defined; however, they will need to be based on similar considerations as in the LTE 4G system.

C. Signaling of Positioning Information

A positioning result is a result of processing of obtained measurements, including cell Identifiers (IDs), power levels, received signal strengths, etc., and it may be exchanged among nodes in one of the predefined formats. The signaled positioning result is represented in a predefined format corresponding to one of the so called Geographical Area Description (GAD) shapes. Other formats, e.g. string address format, are also known.

In LTE, the positioning result may be signaled between:
LCS target and LCS server, e.g. over LPP protocol,
Positioning servers (e.g., E-SMLC and SLP) over standardized or proprietary interfaces,
Positioning server and other network nodes (e.g., E-SMLC and MME/Mobile Switching Center (MSC)/GMLC/Operation and Maintenance (O&M)/Self-Organizing Network (SON)),
Positioning node and LCS client (e.g., between E-SMLC and Public Safety Answering Point (PSAP) or between SLP and external LCS client or between E-SMLC and UE).

There are seven GAD shapes. The polygon shape is discussed in the next subsection where the Cell Identifier (CID) positioning method is described. The other six formats are:

Ellipsoid arc: The ellipsoid arc is described by a center point (eNB antenna position), encoded as latitude, longitude in World Geodetic System (WGS) 84 coordinates. Furthermore, the format contains an inner radius of the arc, a thickness of the arc as well as the offset angle (clockwise from north) and the included angle (opening angle). Together, these parameters define a circular sector, with a thickness and with left and right angles. The ellipsoid arc carries confidence information. This format is, for example, produced by cell ID+Timing Advance (TA) positioning in LTE.

Ellipsoid point: The ellipsoid point format is described by a center point, encoded as latitude, longitude in WGS 84 coordinates. The format neither carries uncertainty nor confidence information.

Ellipsoid point with uncertainty circle: The ellipsoid point with uncertainty circle format consists of a center point, encoded as latitude, longitude in WGS 84 coordinates, in combination with a radial uncertainty radius. The format does not carry confidence information. This is addressed by the present disclosure.

Ellipsoid point with uncertainty ellipse: The ellipsoid point with uncertainty ellipse format consists of a center point, encoded as latitude, longitude in WGS 84 coordinates. The uncertainty ellipse is encoded as a semi-major axis, a semi-minor axis and an angle relative to north, counted clockwise from the semi-major axis. The format carries confidence information. This format is typically produced by Observed TDOA (OTDOA) and A-GPS positioning in LTE.

Ellipsoid point with altitude: The ellipsoid point with altitude format is encoded as an ellipsoid point, together with an encoded altitude. The format neither carries uncertainty nor confidence information.

Ellipsoid point with altitude and uncertainty ellipsoid: This is the format commonly received from A-GPS capable terminals. It consists of an ellipsoid point with altitude and an uncertainty ellipsoid, the latter encoded with a semi-major axis, a semi-minor axis, an angle relative to north, counted clockwise from the semi-major axis, together with an uncertainty altitude. The format carries confidence information. This format is typically produced by A-GPS positioning in LTE.

D. CID Positioning

All cellular systems are divided into cells, served by one specific base station. Each base station may serve more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity of the particular geographical area.

In several systems, the preferred representation of the geographical extension of the cell is given by the cell polygon format. The extension of a cell is described by 3-15 corners of a closed polygon which does not intersect itself. The format is two dimensional (2) and the corners are determined as pairs of longitudes and latitudes in the WGS 84 geographical reference system, see FIG. 4 and FIG. 5 for details. The polygon format is at the focal point of the present disclosure.

E. Enhanced CID (E-CID) Positioning

E-CID methods exploit four sources of position information: the CID and the corresponding geographical description of the serving cell, the TA of the serving cell, the CIDs and the corresponding signal measurements of the cells (up to 32 cells in LTE, including the serving cell), as well as Angle of Arrival (AoA) measurements. The following techniques are commonly used for E-CID:

CID+TA (combining of the geographical cell description, the eNB position, and the distance between the eNB and the UE obtained from a time measurement, where the timing measurement is TA in LTE), Signal strength (distance measures are derived from signal strengths measured in the UE and combined with cell polygons as for CID and TA), AoA (e.g., defining the angle of a UE with respect to a reference direction which is the geographical North).

In 5G systems, large antenna arrays are expected to become common. This implies that the accuracy of AoA will improve dramatically, as compared to present systems. In addition, the improved resolution will be available both in azimuth and elevation. This means that for small 5G cells it will be possible to find a very accurate direction from the base station to the UE. In 5G, the radio bandwidth will also increase, the consequence of which is an increased time resolution. This improvement carries over to a correspondingly better range inaccuracy. When AoA and TA information is combined in 5G, it will hence become possible to determine a small volume where the UE is located, perhaps with only a few meters inaccuracy in all dimensions. This means that E-911 requirements are likely to be met in small 5G cells, indoor and outdoor. However, for large rural cells this is no longer true since the inaccuracy of AoA scales linearly with the distance from the base station to the UE.

F. Adaptive Enhanced CID Fingerprinting

Fingerprinting positioning algorithms operate by creating a radio fingerprint for each point of a fine coordinate grid that covers the Radio Access Network (RAN). Fingerprinting methods are typically not standardized and rely on measurements collected, e.g., for E-CID, OTDOA, etc. or even measurements originally collected for other purposes than positioning.

In LTE the fingerprint may, e.g., consist of:

The cell IDs that are detected by the terminal, in each grid point.

Quantized path loss or signal strength measurements, with respect to multiple eNBs, performed by the terminal, in each grid point. Note: an associated ID of the eNB may also be needed.

Quantized TA, in each grid point. Note: an associated ID of the eNB may also be needed.

AoA measurements performed in one or several eNBs.

Whenever a position request arrives to the positioning method, a radio fingerprint is first measured, after which the corresponding grid point is looked up and reported. This of course requires that the point is unique.

The database of fingerprinted positions (the radio map) can be generated in several ways. A first alternative would be to perform an extensive surveying operation that performs fingerprinting radio measurements repeatedly for all coordinate grid points of the RAN. The disadvantages of this approach include:

The surveying required becomes substantial also for small cellular networks.

The radio fingerprints are in some instants (e.g., signal strength) sensitive to the orientation of the terminal, a fact that is particularly troublesome for handheld terminals. For fine grids, the accuracies of the fingerprinted positions therefore become highly uncertain. This is unfortunately seldom reflected in the accuracy of the reported geographical result.

Another approach is to replace the fine grid by high precision position measurements of opportunity, and to provide fingerprinting radio measurements for said points. This avoids the above drawbacks, however:

Algorithms for clustering of high precision position measurements of opportunity needs to be defined.

Algorithms for computation of geographical descriptions of the clusters need to be defined.

The above two problems are addressed by previous patents on the Adaptive E-CID (AECID) positioning method. This is further described below.

Of particular importance for the present disclosure is the augmentation of AECID with altitude information. U.S. Pat. No. 8,892,124 discloses how the AECID algorithm can be used to provide polygons with altitude information augmented to each corner. This is a starting point for the present disclosure. In addition, U.S. Pat. No. 8,170,582 discloses reporting format details and signaling aspects for a polygon with augmented altitudes.

G. Assisted Global Navigation Satellite System (A-GNSS)

A-GPS positioning is an enhancement of the GPS. A-GPS is a subset of the A-GNSS positioning method supported in LTE for UEs that are equipped with radio receivers capable of receiving Global Navigation Satellite System (GNSS) signals. Examples of satellite systems of A-GNSS include GPS, modernized GPS, Galileo, Global Navigation Satellite System (GLONASS), and Beidu. The operation of satellite based systems like A-GPS is well known today and can be studied in many textbooks.

H. TDOA Positioning

TDOA positioning is the principle used for the present disclosure, and a more extensive description of TDOA positioning is therefore provided below.

III. TDOA Positioning

A. OTDOA

The downlink OTDOA method relies on measurements, typically on PRSs in LTE, see above, from multiple base stations. The measurement is performed by means of correlation with the known signals of the base stations measured upon. The situation is depicted in FIG. 6.

Assuming that the measurements are successful for a number of cells, three of which are depicted in FIG. 6, the following relations between the measured TOAs in the terminal, the transmission times from the base stations (eNBs in LTE), and the distances between the terminals and the base stations follow:

$$t_{TOA,1} + b_{clock} = T_1 + \|r_1 - r_{Terminal}\|/c$$
$$\vdots$$
$$t_{TOA,n} + b_{clock} = T_n + \|r_n - r_{Terminal}\|/c.$$

Here $t_{TOA,i}$, i=1, . . . , n denotes the measured TOAs in the terminal, $T_i$, i=1, . . . , n denotes the transmission times from the eNBs, and c is the speed of light. The boldface quantities are the (vector) locations of the base stations and the terminal. $b_{clock}$ denotes the unknown clock bias of the terminal with respect to cellular system time. Now, in TDOA positioning, TOA differences with respect to the own site are formed according to:

$$t_{TDOA,2} = t_{TOA,2} - t_{TOA,1} = T_2 - T_1 + \|r_2 - r_{Terminal}\|/c - \|r_1 - r_{Terminal}\|/c$$
$$\vdots$$
$$t_{TDOA,n} = t_{TOA,n} - t_{TOA,1} = T_n - T_1 + \|r_n - r_{Terminal}\|/c - \|r_1 - r_{Terminal}\|/c.$$

Note that the formation of differences eliminates $b_{clock}$. In the above n−1 equations, the left hand sides are known (with some additional measurement error), provided that the time of transmission differences (denoted the real time differences) can be measured. This is normally achieved with dedicated LMUs, see above, or by other procedures. Further, the locations of the base stations, $r_i$, i=1, . . . , n, can be surveyed to within a few meters and so they are known as well. What remains unknown is the terminal location, i.e.

$$r_{Terminal} = (x_{Terminal}, y_{Terminal}, z_{Terminal})^T.$$

In the more common case, a 2D positioning is performed the unknown position is instead $$r_{Terminal} = (x_{Terminal}, y_{Terminal})^T.$$

It then follows that at least three TOA differences are needed in order to find a three dimensional (3D) terminal position and that at least two TOA differences are needed in order to find a 2D terminal position. This, in turn, means that at least four sites need to be detected for 3D terminal positioning and at least three sites need to be detected for 2D terminal positioning. In practice, accuracy can be improved if more measurements are collected and a maximum likelihood solution is introduced. There may also be multiple (false) solutions in cases where only a minimum number of sites are detected.

The OTDOA method belongs to the set of high precision methods, the inaccuracy is however significantly larger than that of A-GNSS. The main advantage of OTDOA is that it provides high precision positioning also indoors, a situation where the availability of A-GNSS is very limited.

B. U-TDOA

The U-TDOA method differs from the OTDOA method in the sense that pilot signals are transmitted by the UE, with TOA measurements being performed in multiple base stations. Typically, SRSs are used as pilot signals. The position calculation is performed in the same way as the OTDOA method. Therefore OTDOA and U-TDOA are both handled by the present disclosure.

C. Hybrid Positioning

The present disclosure discloses a new method for hybrid positioning; therefore, the state of the art of TDOA hybrid positioning methods is discussed below.

IV. Hybrid TDOA Positioning

A. TDOA Positioning Aspects

In many rural positioning topographies, the landscape is relatively flat. This means that the base stations are located in almost the same horizontal plane. This horizontal geometry makes it difficult to estimate the vertical position coordinate of a UE, leading to large vertical inaccuracy for TDOA positioning methods.

Another aspect is that a dense deployment of base stations is often not economical in rural areas. As a consequence, the inter-site distance becomes large. This affects the possibility for mobiles to detect neighbor base station transmissions, and it affects the possibility for neighbor base stations to receive UE transmission. As a consequence, OTDOA and U-TDOA both experience problems in that few TDOAs can be used for the position calculation. Sometimes this number is only two, in which case only a horizontal position calculation is possible.

B. Hybrid TDOA Positioning

The hybrid TDOA positioning method that is of interest was disclosed in U.S. Pat. No. 7,203,499. In that patent, a method is disclosed that replaces the unknown vertical position of the TDOA equations with a predetermined function of the lateral coordinates, thereby reducing the TDOA equations to dependency only of the two lateral unknown UE coordinates. After these unknowns have been determined, the predetermined function is evaluated to obtain the vertical coordinate. It is stressed that U.S. Pat. No. 7,203,499 does not specify the function, it states that Geographical Information System (GIS), i.e. typically maps, is used to define the function of the lateral coordinates.

C. Vertical Surface Modeling

The vertical surface modeling that is of interest also needs to be discussed. The relevant disclosure is U.S. Pat. No. 7,676,232, which discloses a surface modeling method where a polygon format is the starting point. Map data is then used to extract the altitude for each corner point, said altitudes can then be encoded as Third Generation Partnership Project (3GPP) points and augmented with the polygon. This information is then signaled over an interface. At the other end of the interface, a vertical function, like the one discussed in the previous section, is then computed, e.g., with least squares techniques.

SUMMARY

Systems and methods are disclosed herein that relate to positioning in a cellular communications system. In some embodiments, a method for determining a three dimensional (3D) location of a wireless device in a cellular communications network comprises obtaining a plurality of measurements for a wireless device, where the plurality of measurements are Time Difference of Arrival (TDOA) related measurements. The method further comprises computing a 3D position of the wireless device using the plurality of measurements and a vertical surface model, wherein the vertical surface model is a translated and scaled version of an initial vertical surface model. The new vertical surface model provides translation and scaling of the initial vertical surface model to a suitable range before it is used to determine the 3D position of the wireless device such that accuracy is improved, e.g., in large rural cells.

In some embodiments, both the vertical surface model and the initial vertical surface model are models of, for each cell j of one or more cells in the cellular communications network, altitude, z, at points within an interior of a polygon that represents the cell j. Further, in some embodiments, both the vertical surface model and the initial vertical surface model are based on polygon corners of the polygon in the horizontal plane augmented with vertical information for each corner of the polygon. Further, in some embodiments, the vertical surface model is further based on a translation vector and a scaling matrix. Further, in some embodiments, the vertical surface model is further based on virtual points on 3D line segments between the augmented corners of the polygon.

In some embodiments, the vertical surface model is defined as:

$$\tilde{z} = f^T(\tilde{x}, \tilde{y}) \hat{\tilde{d}}_j, (\tilde{x}\tilde{y}0)^T \in \widetilde{cell\,j}$$

where:

$\tilde{x}$, $\tilde{y}$, and $\tilde{z}$ are a Cartesian x-coordinate, a Cartesian y-coordinate, and an altitude value, respectively, in the scaled and translated surface model;

$f(\tilde{x}, \tilde{y})$ is defined as:

$$f(\tilde{x}, \tilde{y}) = (1 \ldots \tilde{y}^{Q(j)} \tilde{x}\tilde{y} \ldots \tilde{x}\tilde{y}^{Q(j)} \ldots \tilde{x}^{P(j)} \tilde{y}^{Q(j)})^T$$

where P(j) and Q(j) are each a bi-nominal degree;

$\hat{\tilde{d}}_j$ is defined as:

$$\hat{\tilde{d}}_j = \tilde{R}_j^{-1} \tilde{r}_j,$$

$$\tilde{R}_j = \sum_{i=1}^{M(j)} f(\tilde{x}_{i,j}, \tilde{y}_{i,j}) f^T(\tilde{x}_{i,j}, \tilde{y}_{i,j}),$$

$$\tilde{r}_j = \sum_{i=1}^{M(j)} \tilde{z}_{i,j} f(\tilde{x}_{i,j}, \tilde{y}_{i,j})$$

where $\tilde{x}_{i,j}$, $\tilde{y}_{i,j}$, and $\tilde{z}_{i,j}$ are a Cartesian x-coordinate, a Cartesian y-coordinate, and an altitude value, respectively, for each i-th scaled polygon corner of the polygon that represents cell j in the vertical surface model, where:

$$\begin{pmatrix} \tilde{x}_{i,j} \\ \tilde{y}_{i,j} \\ \tilde{z}_{i,j} \end{pmatrix} = \begin{pmatrix} \sigma_{x,j}^{-1} & 0 & 0 \\ 0 & \sigma_{y,j}^{-1} & 0 \\ 0 & 0 & \sigma_{z,j}^{-1} \end{pmatrix} \begin{pmatrix} x_{i,j} - \langle x_j \rangle \\ y_{i,j} - \langle y_j \rangle \\ z_{i,j} - \langle z_j \rangle \end{pmatrix}$$

and:

$\tilde{x}_{i,j}$ is a Cartesian x-coordinate of the i-th scaled and translated polygon corner of the polygon that represents cell j in the vertical surface model;

$\tilde{y}_{i,j}$ is a Cartesian y-coordinate of the i-th scaled and translated polygon corner of the polygon that represents cell j in the vertical surface model;

$\tilde{z}_{i,j}$ is an altitude value of the i-th scaled and translated polygon corner of the polygon that represents cell j in the vertical surface model;

$x_{i,j}$ is a Cartesian x-coordinate of the i-th polygon corner of the polygon that represents cell j in the initial vertical surface model;

$y_{i,j}$ is a Cartesian y-coordinate of the i-th polygon corner of the polygon that represents cell j in the initial vertical surface model;

$z_{i,j}$ is an altitude value of the i-th polygon corner of the polygon that represents cell j in the initial vertical surface model;

$\langle x_j \rangle$ is a translation value applied to $x_{i,j}$;

$\langle y_j \rangle$ is a translation value applied to $y_{i,j}$;

$\langle z_j \rangle$ is a translation value applied to $z_{i,j}$;

$\sigma_{x,j}^{-1}$ is a scaling factor applied to $x_{i,j}$;

$\sigma_{y,j}^{-1}$ is a scaling factor applied to $y_{i,j}$; and $\sigma_{z,j}^{-1}$ is a scaling factor applied to $z_{i,j}$.

Further, in some embodiments, the translation values and scaling factors are defined as:

$$\begin{pmatrix} \langle x_j \rangle \\ \langle y_j \rangle \\ \langle z_j \rangle \end{pmatrix} = \frac{1}{M(j)} \sum_{i=1}^{M(j)} \begin{pmatrix} x_{i,j} \\ y_{i,j} \\ z_{i,j} \end{pmatrix},$$

$$\sigma_{x,j} = c_x \max_{i_1, i_2} |x_{i_1,j} - x_{i_2,j}|,$$

$$\sigma_{y,j} = c_y \max_{i_1, i_2} |y_{i_1,j} - y_{i_2,j}|,$$

$$\sigma_{z,j} = c_z \max_{i_1, i_2} |z_{i_1,j} - z_{i_2,j}|.$$

where M(j) is a number of polygon corners for cell j and $c_x$, $c_y$, $c_z$ are scaling constants.

In some embodiments, the method is performed by a positioning node.

In some other embodiments, a method for determining a translated and scaled vertical surface model for cells in a cellular communications network comprises obtaining an initial vertical surface model for cells in a cellular communications network and translating and scaling the initial vertical surface model to provide a new vertical surface model. In some embodiments, the method further comprises using the new vertical surface model. In some embodiments, using the new vertical surface model comprises using the new vertical surface model to compute a 3D position of a wireless device.

In some embodiments, both the new vertical surface model and the initial vertical surface model are models of, for each cell j, altitude, z, at points within an interior of a polygon that represents the cell j. Further, in some embodiments, both the vertical surface model and the initial vertical surface model are based on polygon corners of the polygon in the horizontal plane augmented with vertical information for each corner of the polygon. Further, in some embodiments, translating and scaling the initial vertical surface model to provide the new vertical surface model comprises translating and scaling the initial vertical surface model based on a translation vector and a scaling matrix. Further, in some embodiments, the new vertical surface model is further based on virtual points on 3D line segments between the augmented corners of the polygon.

In some embodiments, the vertical surface model is defined as:

$$\tilde{z} = f^T(\tilde{x}, \tilde{y}) \hat{\tilde{d}}_j, (\tilde{x}\tilde{y}0)^T \in \tilde{cell}\ j$$

where:

$\tilde{x}$, $\tilde{y}$, and $\tilde{z}$ are a Cartesian x-coordinate, a Cartesian y-coordinate, and an altitude value, respectively, in the scaled and translated surface model;

$f(\tilde{x}, \tilde{y})$ is defined as:

$$f(\tilde{x},\tilde{y}) = (1 \ldots \tilde{y}^{Q(j)} \tilde{x}\tilde{x}\tilde{y} \ldots \tilde{x}\tilde{y}^{Q(j)} \ldots \tilde{x}^{P(j)}\tilde{y}^{Q(j)})^T$$

where P(j) and Q(j) are each a bi-nominal degree;

$\hat{\tilde{d}}_j$ is defined as:

$$\hat{\tilde{d}}_j = \tilde{R}_j^{-1} \tilde{r}_j,$$

$$\tilde{R}_j = \sum_{i=1}^{M(j)} f(\tilde{x}_{i,j}, \tilde{y}_{i,j}) f^T(\tilde{x}_{i,j}, \tilde{y}_{i,j}),$$

$$\tilde{r}_j = \sum_{i=1}^{M(j)} \tilde{z}_{i,j} f(\tilde{x}_{i,j}, \tilde{y}_{i,j})$$

where $\tilde{x}_{i,j}$, $\tilde{y}_{i,j}$, and $\tilde{z}_{i,j}$ are a Cartesian x-coordinate, a Cartesian y-coordinate, and an altitude value, respectively, for each i-th scaled polygon corner of the polygon that represents cell j in the vertical surface model, where:

$$\begin{pmatrix} \tilde{x}_{i,j} \\ \tilde{y}_{i,j} \\ \tilde{z}_{i,j} \end{pmatrix} = \begin{pmatrix} \sigma_{x,j}^{-1} & 0 & 0 \\ 0 & \sigma_{y,j}^{-1} & 0 \\ 0 & 0 & \sigma_{z,j}^{-1} \end{pmatrix} \begin{pmatrix} x_{i,j} - \langle x_j \rangle \\ y_{i,j} - \langle y_j \rangle \\ z_{i,j} - \langle z_j \rangle \end{pmatrix}$$

and:

$\tilde{x}_{i,j}$ is the Cartesian x-coordinate of the i-th scaled and translated polygon corner of the polygon that represents cell j in the vertical surface model;

$\tilde{y}_{i,j}$ is the Cartesian y-coordinate of the i-th scaled and translated polygon corner of the polygon that represents cell j in the vertical surface model;

$\tilde{z}_{i,j}$ is the altitude value of the i-th scaled and translated polygon corner of the polygon that represents cell j in the vertical surface model;

$x_{i,j}$ is a Cartesian x-coordinate of the i-th polygon corner of the polygon that represents cell j in the initial vertical surface model;

$y_{i,j}$ is a Cartesian y-coordinate of the i-th polygon corner of the polygon that represents cell j in the initial vertical surface model;

$z_{i,j}$ is an altitude value of the i-th polygon corner of the polygon that represents cell in j vertical surface model;

$\langle x_j \rangle$ is a translation value applied to $x_{i,j}$;

$\langle y_j \rangle$ is a translation value applied to $y_{i,j}$;

$\langle z_j \rangle$ is a translation value applied to $z_{i,j}$;

$\sigma_{x,j}^{-1}$ is a scaling factor applied to $x_{i,j}$;

$\sigma_{y,j}^{-1}$ is a scaling factor applied to $y_{i,j}$; and $\sigma_{z,j}^{-1}$ is a scaling factor applied to $z_{i,j}$.

In some embodiments, the scaled polygon corners represented by $\tilde{x}_{i,j}$, $\tilde{y}_{i,j}$, and $\tilde{z}_{i,j}$ include one or more virtual points on one or more 3D line segments between the polygon corners of the vertical surface model. Further, in some embodiments, the translation values and scaling factors are defined as:

$$\begin{pmatrix} \langle x_j \rangle \\ \langle y_j \rangle \\ \langle z_j \rangle \end{pmatrix} = \frac{1}{M(j)} \sum_{i=1}^{M(j)} \begin{pmatrix} x_{i,j} \\ y_{i,j} \\ z_{i,j} \end{pmatrix},$$

$$\sigma_{x,j} = c_x \max_{i_1,i_2} |x_{i_1,j} - x_{i_2,j}|,$$

$$\sigma_{y,j} = c_y \max_{i_1,i_2} |y_{i_1,j} - y_{i_2,j}|,$$

$$\sigma_{z,j} = c_z \max_{i_1,i_2} |z_{i_1,j} - z_{i_2,j}|.$$

where M(j) is a number of polygon corners for cell j and $c_x$, $c_y$, $c_z$ are scaling constants.

In some embodiments, the method is performed by a positioning node.

Embodiments of a positioning node are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5 illustrates an example data structure for representing a cell polygon;

DETAILED DESCRIPTION

Figure 1:
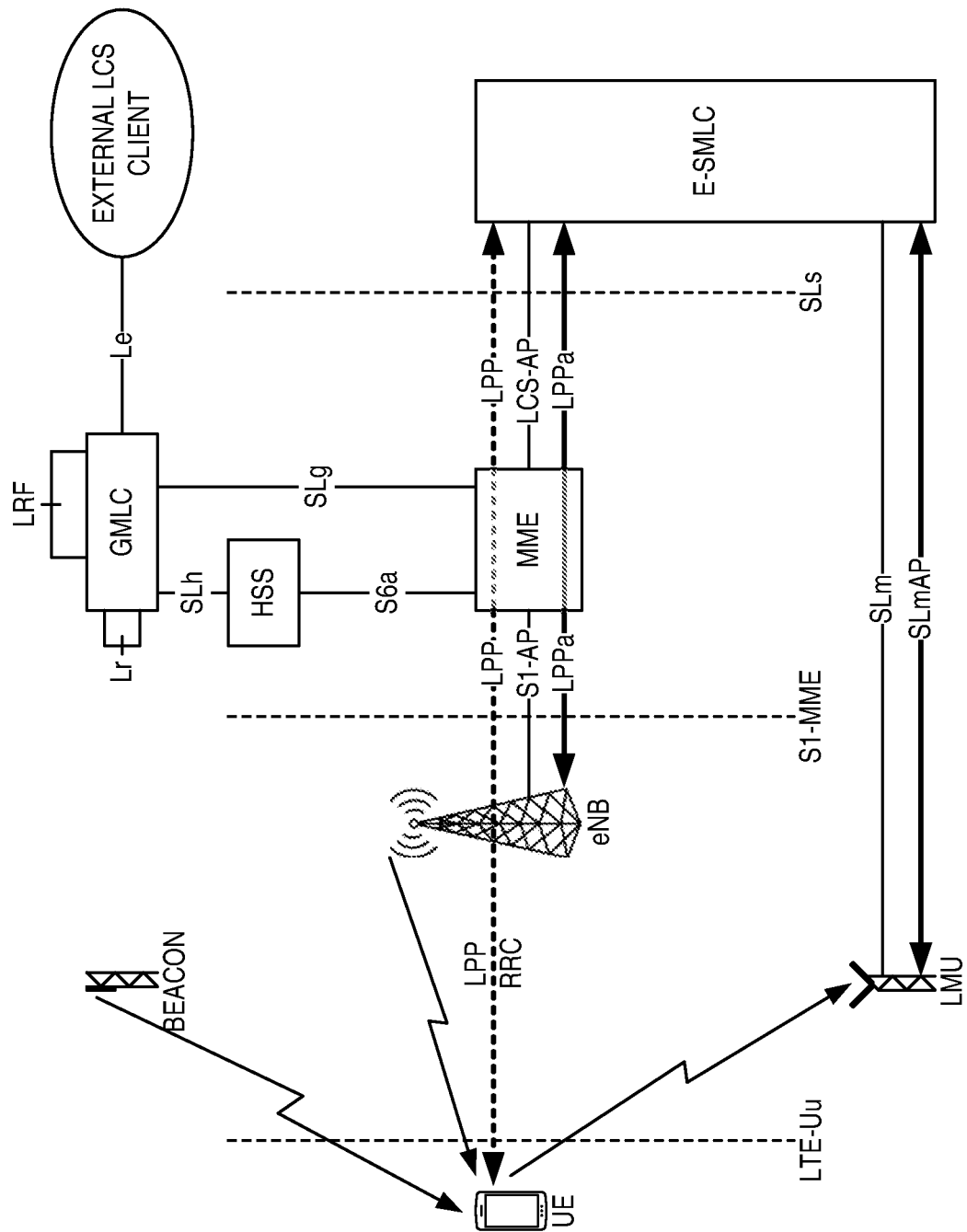
FIG. 1 illustrates the Long Term Evolution (LTE) positioning architecture for the control plane.
Figure 2:
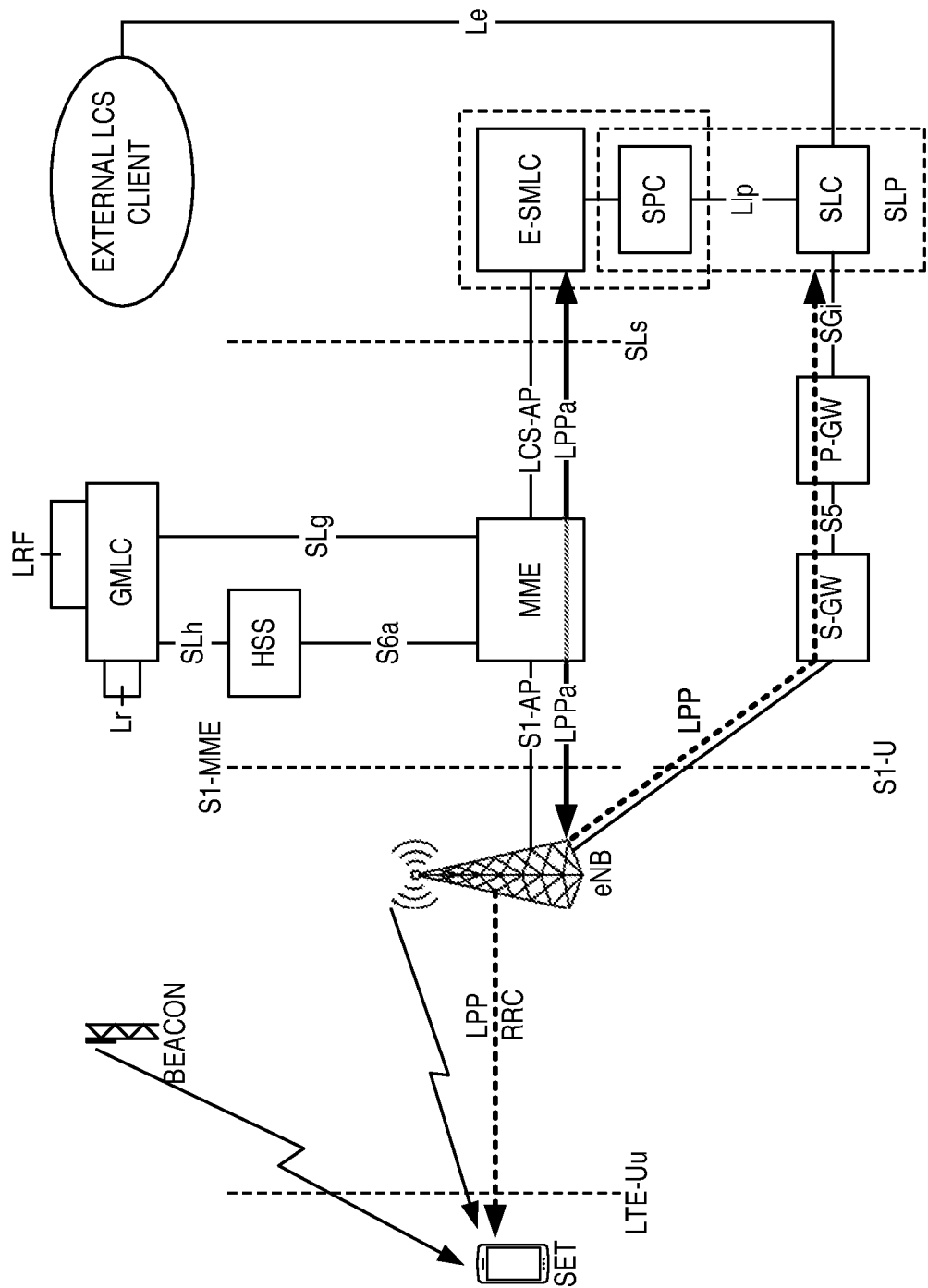
FIG. 2 illustrates the LTE user plane positioning architecture.
Figure 3:
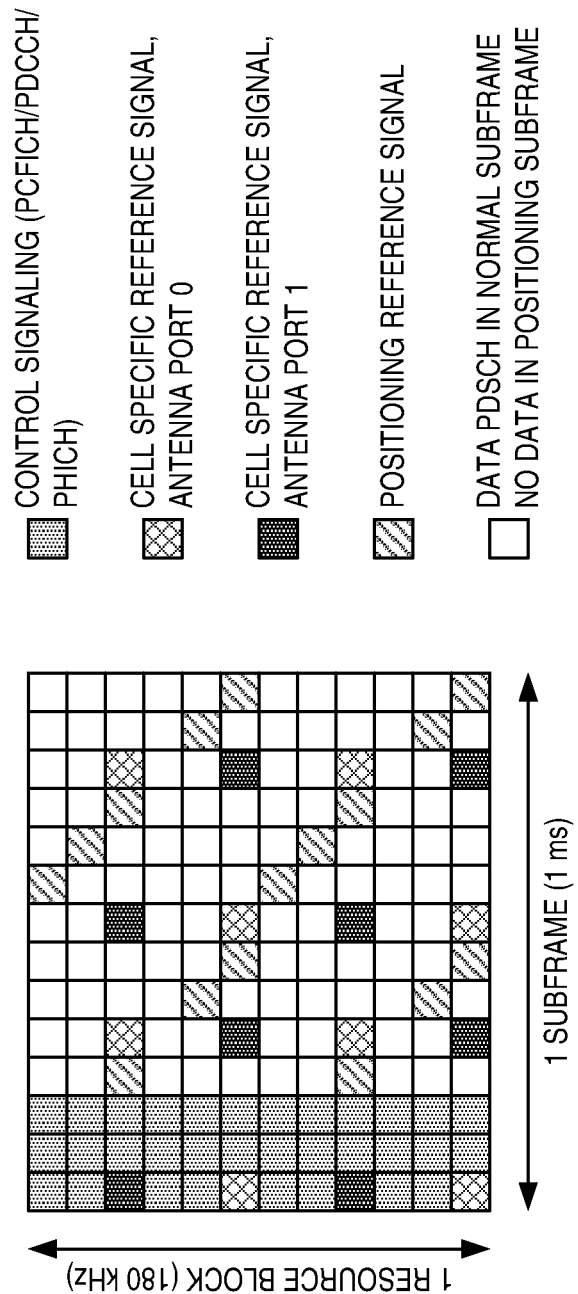
FIG. 3 illustrates an example part of the time-frequency grid of the LTE downlink that depicts the locations of Positioning Reference Signals (PRSs)
Figure 4:
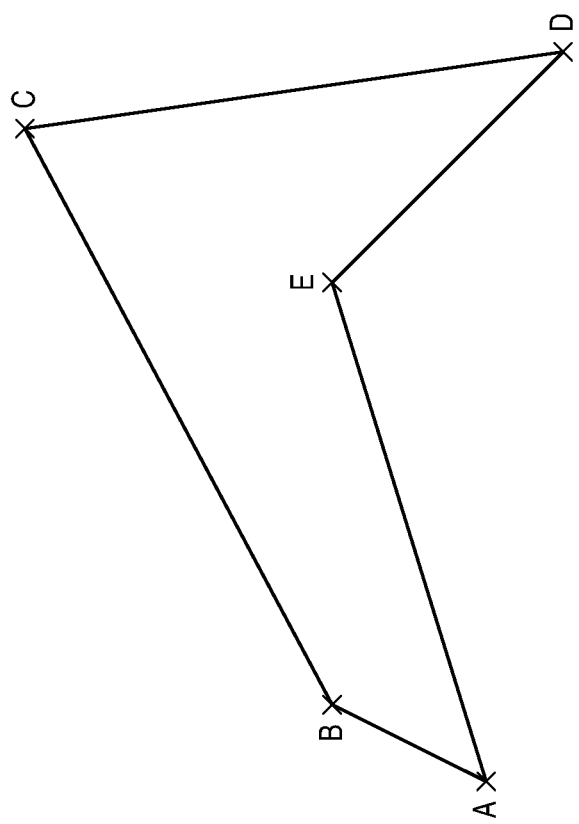
FIG. 4 illustrates an example cell polygon format that gives a geographical extension of a cell.
Figure 6:
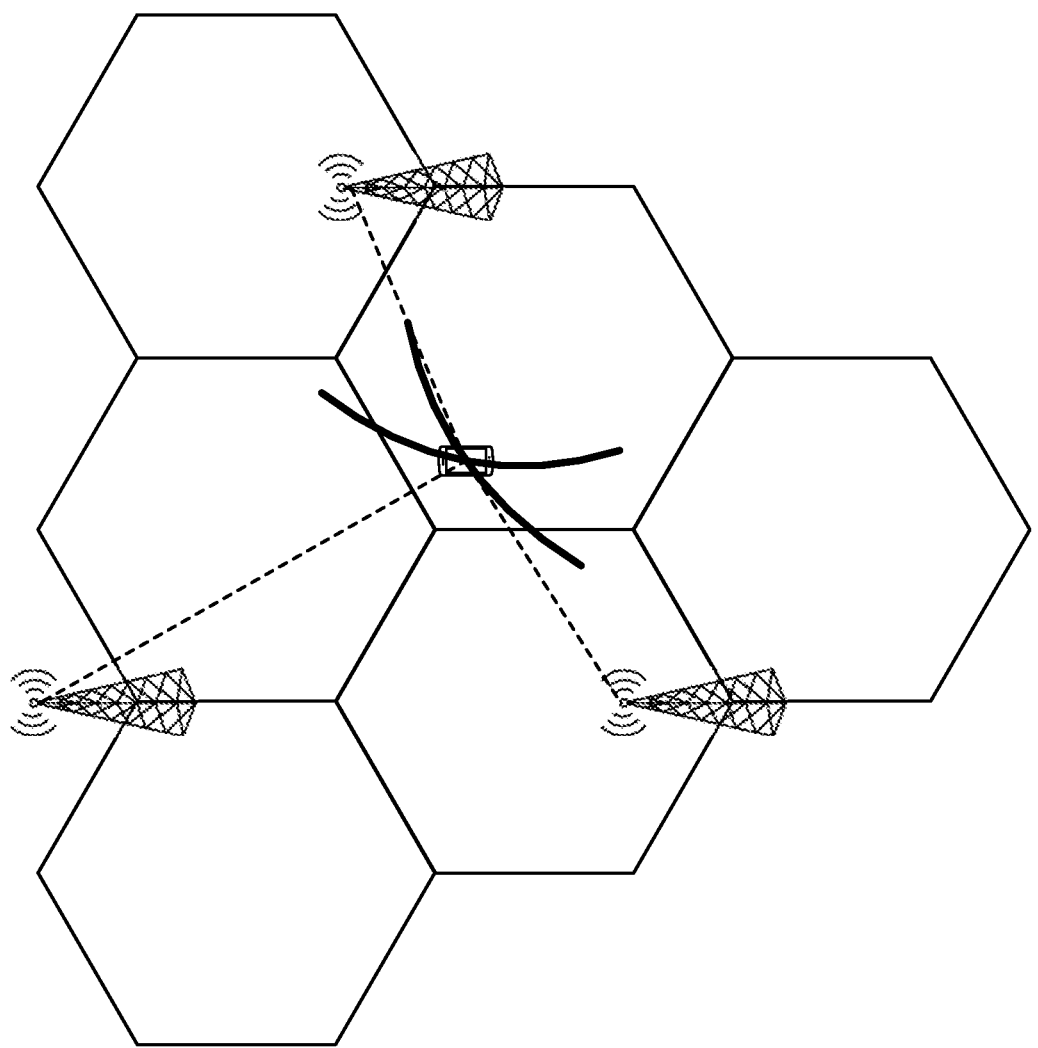
FIG. 6 illustrates Observed Time Difference of Arrival (OTDOA)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a Radio Access Network (RAN) of a cellular communications network. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with respect to positioning in a cellular communications system. In particular, there is no known Time Difference of Arrival (TDOA) positioning method that can provide three dimensional (3D) accuracies meeting E-911 requirements in large rural cells covering hilly terrain, where the sites are coarsely distributed. This also impacts the lawful intercept possibilities since Assisted Global Navigation Satellite System (A-GNSS) can be turned off in mobiles, which is well known to criminals. The hybrid TDOA method proposed in the present disclosure discloses a positioning method with the potential to solve this problem.

In addition, the hybrid positioning method using Geographical Information System (GIS) information of U.S. Pat. No. 7,203,499 does not account for scaling or translation of the lateral variables, the reason for this being listed below. Nor does any other such known method. The method of U.S. Pat. No. 7,203,499 can therefore not be used in a straightforward manner, together with the disclosed surface modeling technique of the present disclosure.

In addition, the surface modeling solution of U.S. Pat. No. 7,676,232 is based on a bi-polynomial model of the surface, in the lateral x and y coordinates. The coefficients of this model determine the vertical model inside of a polygon. However, the solution of the Least Squares (LS) problem that determine the parameters become ill-conditioned, close to singular and produces very poor solutions whenever the variation of x, y, and z is far from 0. In addition, if the mean value of the polygon corner is large, this problem is amplified, rendering severe accuracy problems in practical systems, where said variation is far from zero. This problem is not mentioned or solved in prior solutions.

Still further, the surface modeling solution of U.S. Pat. No. 7,676,232 is obtaining the altitude information of the corners of the polygon from maps, i.e. a GIS system. In case no GIS system is available, the prior art surface modeling method can therefore not be used.

As shown by the present disclosure, a solution to the problem is to translate and scale the position variables to a suitable range before the problem is solved. To further improve, additional points on the boundary of the polygon may be introduced. In order to signal all needed information to nodes that, e.g., compute UE positions in the RAN, core network, and the end user, the information about the scaling, translation, and additional points needs to be signaled as well. However, no standardized reporting format or proposed augmented reporting format support this need.

In 5G, it is likely that the position calculation may be moved to the cloud and distributed within the cloud. However, there is no signaling defined in prior solutions that allow for signaling of the polygon information, augmented with altitude, together with scaling, translation, and additional point parameters.

Certain aspects of the present disclosure and their embodiments may provide solutions to the aforementioned or other challenges. The present disclosure discloses methods that solve the above problems. There are two problems, namely, (i) alack of hybrid TDOA methods with needed functionality and (ii) lack of support for preferred signaling. The first problem is addressed by the present disclosure, the second problem by U.S. Provisional Patent No. 62/633,251 which is the priority document for PCT Application No. [P74279 WO1], entitled SIGNALING OF SCALED 3D POSITION INFORMATION. Note that the solutions to the first and second problems addressed by the present disclosure and the parallel disclosure may be used separately (i.e., each in a standalone manner) or used in combination.

In detail the present disclosure discloses:
1. A new surface modeling method for modeling of the vertical coordinate of the interior of a polygon, the method being based on polygon corners in the horizontal plane augmented with vertical information for each polygon corner, a translation vector and a scaling matrix, and virtual points on the 3D line segment between the augmented corner points.
2. A new TDOA hybrid position calculation method based on the surface model of item 1 above.
3. A new positioning method architecture, where the polygon with corners augmented with vertical information is obtained by a preceding Adaptive Enhanced Cell Identity (AECID) 3D polygon computation step.

Each of these aspects are described in detail below.

Figure 7:
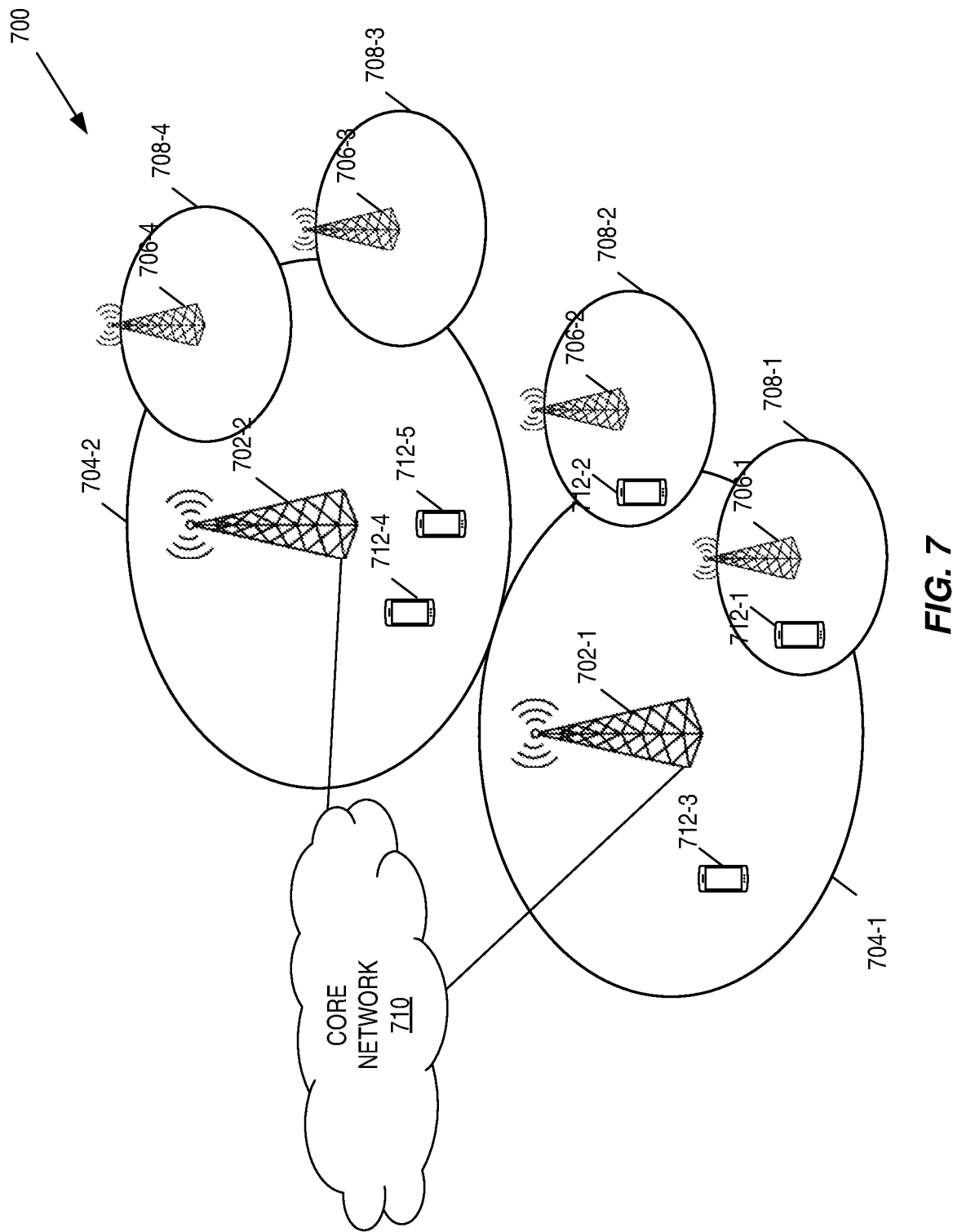
FIG. 7 illustrates one example of a cellular communications network in which embodiments of the present disclosure may be implemented.

FIG. 7 illustrates one example of a cellular communications network 700 in which embodiments of the present disclosure may be implemented. In the embodiments described herein, the cellular communications network 700 is a LTE or 5G NR network, but the present disclosure is not limited thereto. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

While not illustrated, the cellular communications network 700 includes positioning nodes (e.g., Evolved Serving Mobile Location Center (E-SMLC) in LTE or similar positioning node in 5G) and, in some embodiments, other nodes such as, e.g., nodes hosting a positioning database in the radio access network or core network. Further, in some embodiments, the cellular communications network 700 may be connected to a Public Safety Answering Point (PSAP) or other emergency center, a cloud-based positioning database, where these nodes may or may not be considered part of the cellular communications network 700.

As described below, a system and methods related to positioning of a UE (e.g., a wireless device 712) are disclosed herein. Notably, some aspects of the present disclosure may be performed by or implemented in a network node, which may be referred to herein as a positioning node. While 5G positioning standardization is not close to finalization at the time of writing of the present disclosure, the positioning architecture in 5G may, for example, be similar to that used in 3GPP LTE.

I. New Scaled and Translated Surface Model

A. Description of the New Scaled and Translated Surface Model

In some embodiments, a method of generating a new (scaled and translated) surface model is provided. The description of the method first defines the unscaled surface modeling algorithm, after which translation, scaling, and additional points are introduced. The additional points are also referred to herein as virtual corners of the polygon, or virtual polygon corners.

The following unscaled bi-polynomial vertical surface model is first selected, $$z = \sum_{l=0}^{P(j)} \sum_{m=0}^{Q(j)} d_{l,m,j} x^l y^m, (x\ y\ 0) \in \text{cell } j$$

where z is altitude, P(j) is a bi-nominal degree, Q(j) is another bi-nomial degree, $d_{l,m,j}$ are the unknowns in the surface model, and x and y are the two dimensional (2) position variables. Note that the model is here assumed to be Cartesian, i.e. transformed from the latitude-longitude system to a local Cartesian coordinate system, e.g. with the x-axis pointing east, the y-axis pointing north, and the z-axis pointing up, and with the origin somewhere on the global ellipsoidal Earth model used to define latitude and longitude. The above model is linear in the unknowns $d_{l,m,j}$ that determine the surface. These unknowns will be determined from the points that define the corners of the polygon. Towards that end, note that the surface model above can be written as $$z = f^T(x,y) d_j,$$

$$f(x,y) = (1 \ldots y^{Q(j)} x x y \ldots x y^{Q(j)} \ldots x^{P(j)} y^{Q(j)})^T,$$

$$d_j = (d_{0,0,j} \ldots d_{0,Q(j),j} d_{1,0,j} \ldots d_{1,Q(j),j} \ldots d_{P(j),Q(j),j})^T$$

These equations are in linear regression form and LS modeling is therefore applicable. Assume that the number of points of the polygon fulfils $M(j) \geq (P(j)+1)(Q(j)+1)$, where M(j) is the number of corners of the polygon. Then, there are at least as many data points as there are unknowns and the LS problem is normally non-singular. To formulate the LS solution in detail, define the LS modeling error as $$E(d_j) = \sum_{i=1}^{M(j)} (z_{i,j} - f^T(x_{i,j}, y_{i,j}) d_j)^2.$$

Differentiation of the error with respect to d and equating the result to 0 results in the following LS estimate $$\hat{d}_j = R_j^{-1} r_j,$$

$$R_j = \sum_{i=1}^{M(j)} f(x_{i,j}, y_{i,j}) f^T(x_{i,j}, y_{i,j}),$$

$$r_j = \sum_{i=1}^{M(j)} z_{i,j} f(x_{i,j}, y_{i,j})$$

The altitudes in interior points of the cell are obtained from $$z = f^T(x,y) \hat{d}_j, (xy0)^T \in \text{cell } j.$$

As stated above, the LS algorithm does work well close to the origin of the Cartesian coordinate system, but it does not work well when the numerical values of x, y, and z become large.

One solution, disclosed here, is to apply a change of coordinates for each cell j, thereby translating the surface modeling problem back to a situation where the numerical properties are good. To do so, a transformation could, e.g., rescale from m to km, or use the maximum distance between two polygon corners in each of the dimensions. As a first step, a subtraction of the 3D mean value of the polygon corners is needed to translate the cell polygon to be centered around zero. The resulting scaling method can then be defined in terms of the scaled corner variables $$\tilde{p}_{i,j}^C = (\tilde{x}_{i,j}, \tilde{y}_{i,j}, \tilde{z}_{i,j})^T.$$

The scaling transformation then becomes $$\begin{pmatrix} \tilde{x}_{i,j} \\ \tilde{y}_{i,j} \\ \tilde{z}_{i,j} \end{pmatrix} = \begin{pmatrix} \sigma_{x,j}^{-1} & 0 & 0 \\ 0 & \sigma_{y,j}^{-1} & 0 \\ 0 & 0 & \sigma_{z,j}^{-1} \end{pmatrix} \begin{pmatrix} x_{i,j} - \langle x_j \rangle \\ y_{i,j} - \langle y_j \rangle \\ z_{i,j} - \langle z_j \rangle \end{pmatrix},$$

where:
- $\tilde{x}_{i,j}$ is a Cartesian x-coordinate of the i-th scaled and translated polygon corner of the polygon that represents cell j in the vertical surface model;
- $\tilde{y}_{i,j}$ is a Cartesian y-coordinate of the i-th scaled and translated polygon corner of the polygon that represents cell j in the vertical surface model;
- $\tilde{z}_{i,j}$ is an altitude value of the i-th scaled and translated polygon corner of the polygon that represents cell j in the vertical surface model;
- $x_{i,j}$ is a Cartesian x-coordinate of the i-th polygon corner of the polygon that represents cell j in the initial vertical surface model;
- $y_{i,j}$ is a Cartesian y-coordinate of the i-th polygon corner of the polygon that represents cell j in the initial vertical surface model;
- $z_{i,j}$ is an altitude value of the i-th polygon corner of the polygon that represents cell j in the initial vertical surface model;
- $\langle x_j \rangle$ is a translation value applied to $x_{i,j}$;
- $\langle y_j \rangle$ is a translation value applied to $y_{i,j}$;
- $\langle z_j \rangle$ is a translation value applied to $z_{i,j}$;
- $\sigma_{x,j}^{-1}$ is a scaling factor applied to $x_{i,j}$;
- $\sigma_{y,j}^{-1}$ is a scaling factor applied to $y_{i,j}$; and
- $\sigma_{z,j}^{-1}$ is a scaling factor applied to $z_{i,j}$.

Note that, in some embodiments, the scaled polygon corners represented by $\tilde{x}_{i,j}$, $\tilde{y}_{i,j}$, and $\tilde{z}_{i,j}$ include one or more virtual points on one or more 3D line segments between the polygon corners of the vertical surface model. Further, the translation values and scaling factors are defined as:

$$\begin{pmatrix} \langle x_j \rangle \\ \langle y_j \rangle \\ \langle z_j \rangle \end{pmatrix} = \frac{1}{M(j)} \sum_{i=1}^{M(j)} \begin{pmatrix} x_{i,j} \\ y_{i,j} \\ z_{i,j} \end{pmatrix},$$

$$\sigma_{x,j} = c_x \max_{i_1, i_2} |x_{i_1,j} - x_{i_2,j}|,$$

$$\sigma_{y,j} = c_y \max_{i_1, i_2} |y_{i_1,j} - y_{i_2,j}|,$$

$$\sigma_{z,j} = c_z \max_{i_1, i_2} |z_{i_1,j} - z_{i_2,j}|.$$

Here, M(j) is a number of corners for cell j, $c_x$, $c_y$, $c_z$ denote scaling constants that may be used for tuning, $\max_{i_1,i_2}|x_{i_1,j} - x_{i_2,j}|$ denotes a search for a maximum distance between any two corner points in the Cartesian x-coordinate plane, $\max_{i_1,i_2}|y_{i_1,j} - y_{i_2,j}|$ denotes a search for a maximum distance between any two corner points in the Cartesian y-coordinate plane, and $\max_{i_1,i_2}|z_{i_1,j} - z_{i_2,j}|$ denotes a search for a maximum distance between any two corner points in the Cartesian z-coordinate plane. The LS problem defined above is then solved for the scaled and translated corner points. This results in the following scaled and translated surface model $$\tilde{z} = f^T(\tilde{x}, \tilde{y}) \hat{\tilde{d}}_j, (\tilde{x}\tilde{y}0)^T \in \widetilde{cell}_j$$

where (as naturally follows from the LS problem defined above):
- $\tilde{x}$, $\tilde{y}$, and $\tilde{z}$ are Cartesian x-coordinate, Cartesian y-coordinate, and altitude value, respectively, in the scaled and translated surface model;
- $f(\tilde{x}, \tilde{y})$ is defined as:

$$f(\tilde{x}, \tilde{y}) = (1 \ldots \tilde{y}^{Q(j)} \tilde{x}\tilde{y} \ldots \tilde{x}\tilde{y}^{Q(j)} \ldots \tilde{x}^{P(j)} \tilde{y}^{Q(j)})^T$$

$\hat{\tilde{d}}_j$ is defined as:

$$\hat{\tilde{d}}_j = \tilde{R}_j^{-1} \tilde{r}_j,$$

$$\tilde{R}_j = \sum_{i=1}^{M(j)} f(\tilde{x}_{i,j}, \tilde{y}_{i,j}) f^T(\tilde{x}_{i,j}, \tilde{y}_{i,j}),$$

$$\tilde{r}_j = \sum_{i=1}^{M(j)} \tilde{z}_{i,j} f(\tilde{x}_{i,j}, \tilde{y}_{i,j}).$$

In order to use the result in original coordinates, a back transformation results in the following interior surface model of the original augmented polygon $$z = \langle z_j \rangle + \sigma_{z,j} f^T \left( \frac{x - \langle x_j \rangle}{\sigma_{x,j}}, \frac{y - \langle y_j \rangle}{\sigma_{y,j}} \right) \hat{\tilde{d}}_j, (x\ y\ 0)^T \in \text{cell}\ j.$$

This end result is useful to solve practical problems in a cellular network. In case P(j)=Q(j)=3, 16 corners are needed to avoid a singular LS problem, leading to a need to add points on the polygon boundary. Numerical experiments also show that an augmentation of the problem with additional polygon boundary points on the 3D line segments in between polygon corners can provide significantly improved interior surface models. It is therefore recommended to introduce one or several equidistant additional points for every 3D line segment of the augmented polygon. Note that these points are uniquely defined by the information encoded by the augmented polygon format and no additional signaling is therefore required.

It needs to be kept in mind that also other schemes for addition of points on the boundary can be used. This is treated in the parallel disclosure.

B. Performance Illustration

Figure 8:
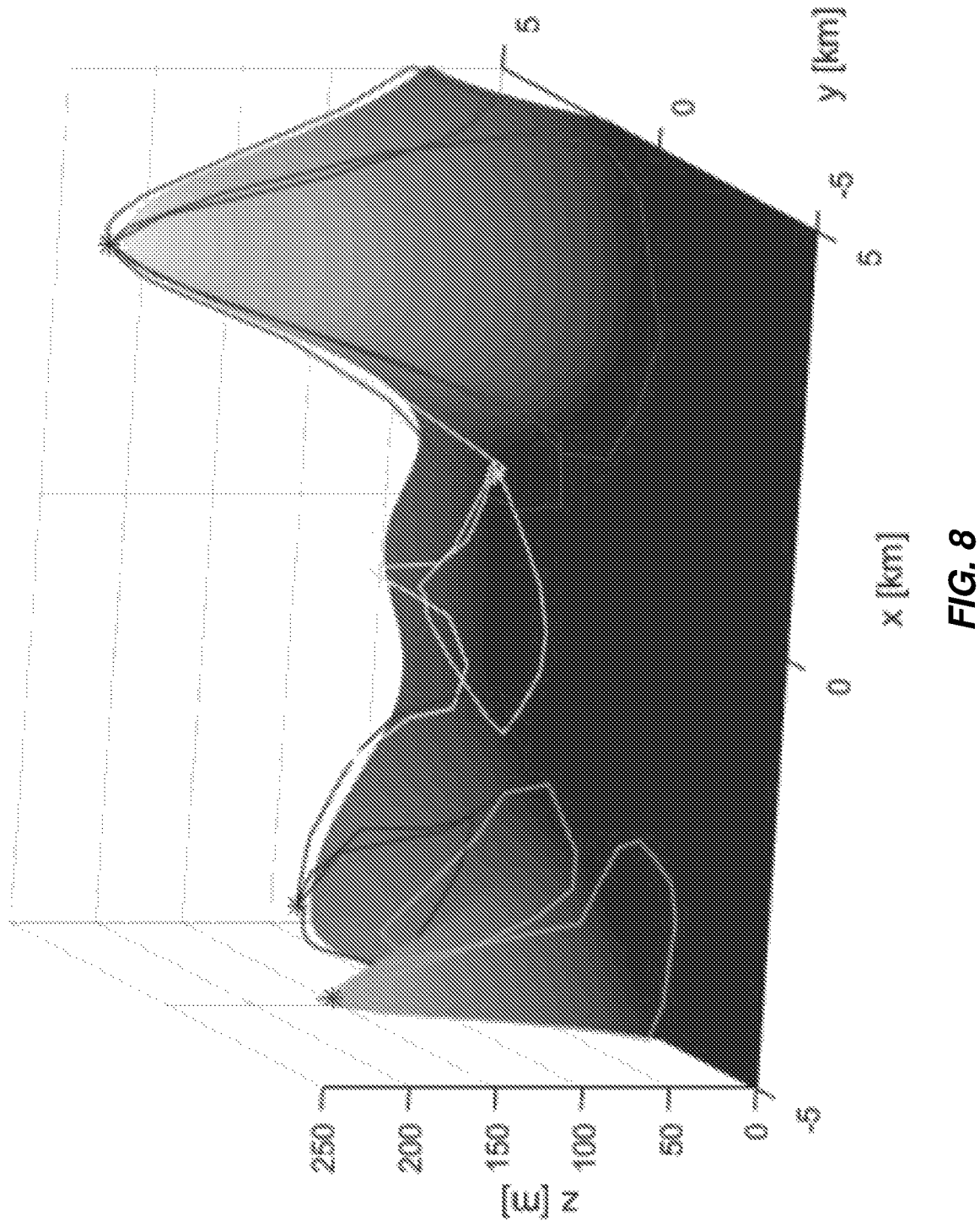
FIGS. 8 through 11 provide an illustration of the performance of the new scaled and translated surface model as disclosed herein.
Figure 9:
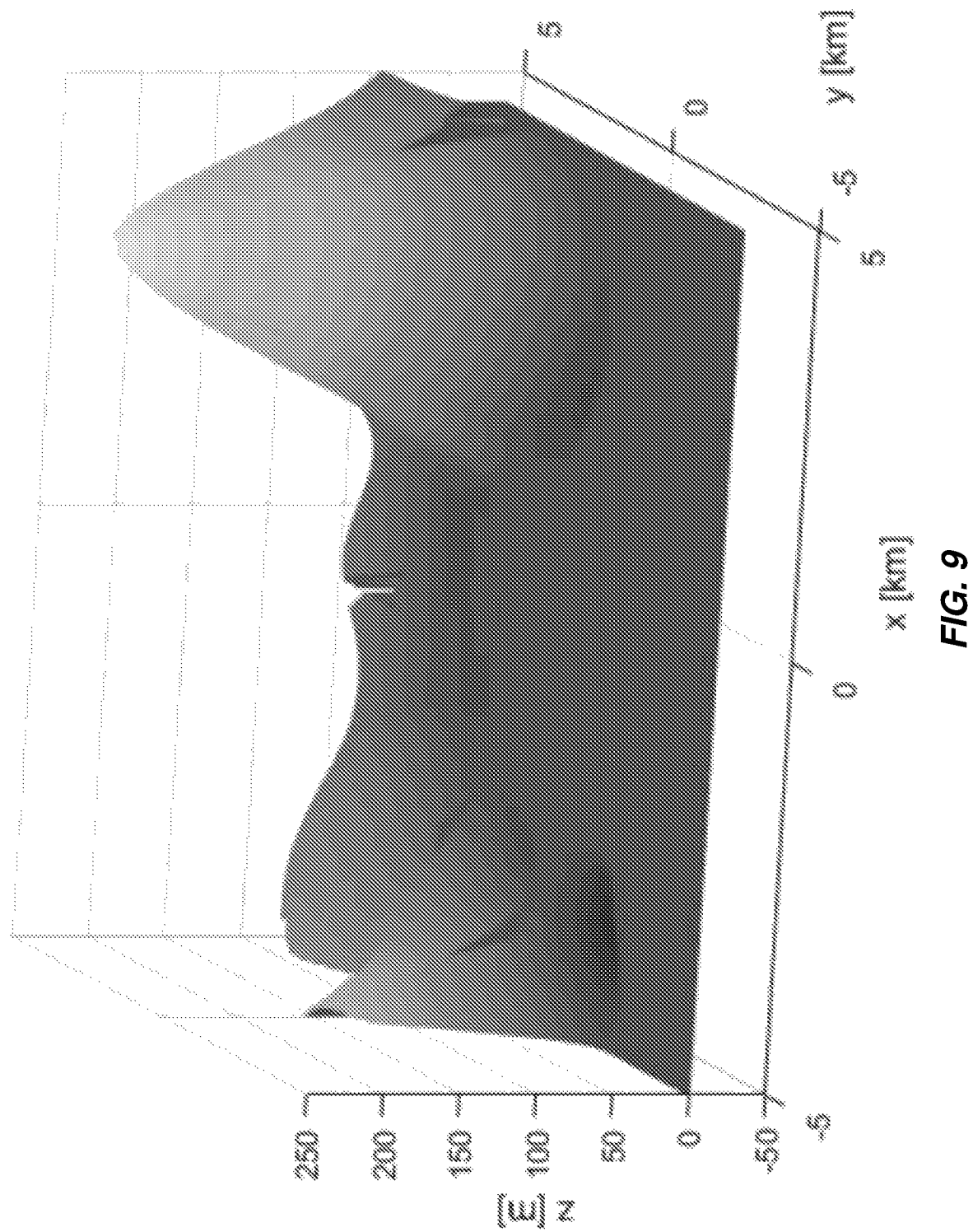
Figure 10:
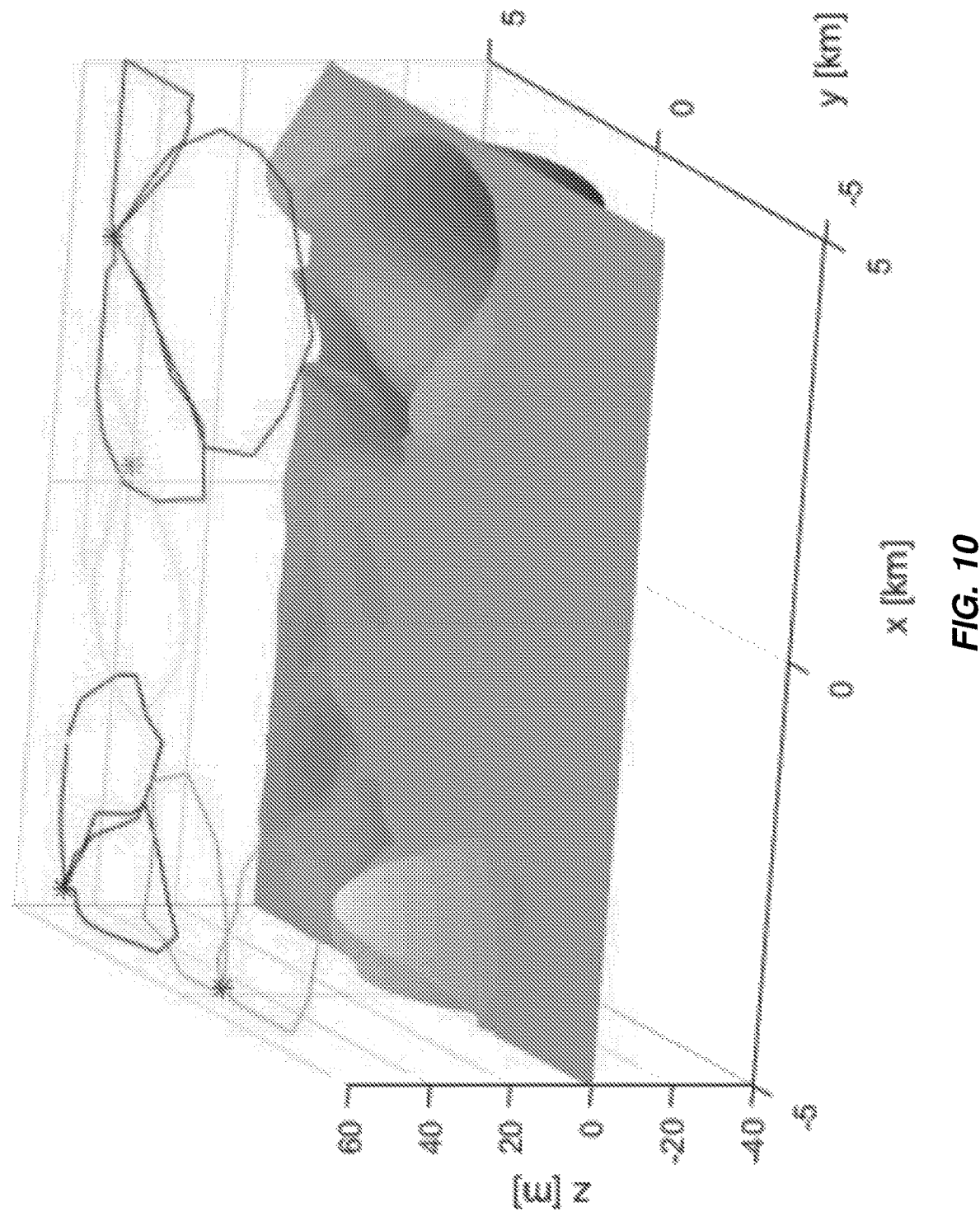
Figure 11:
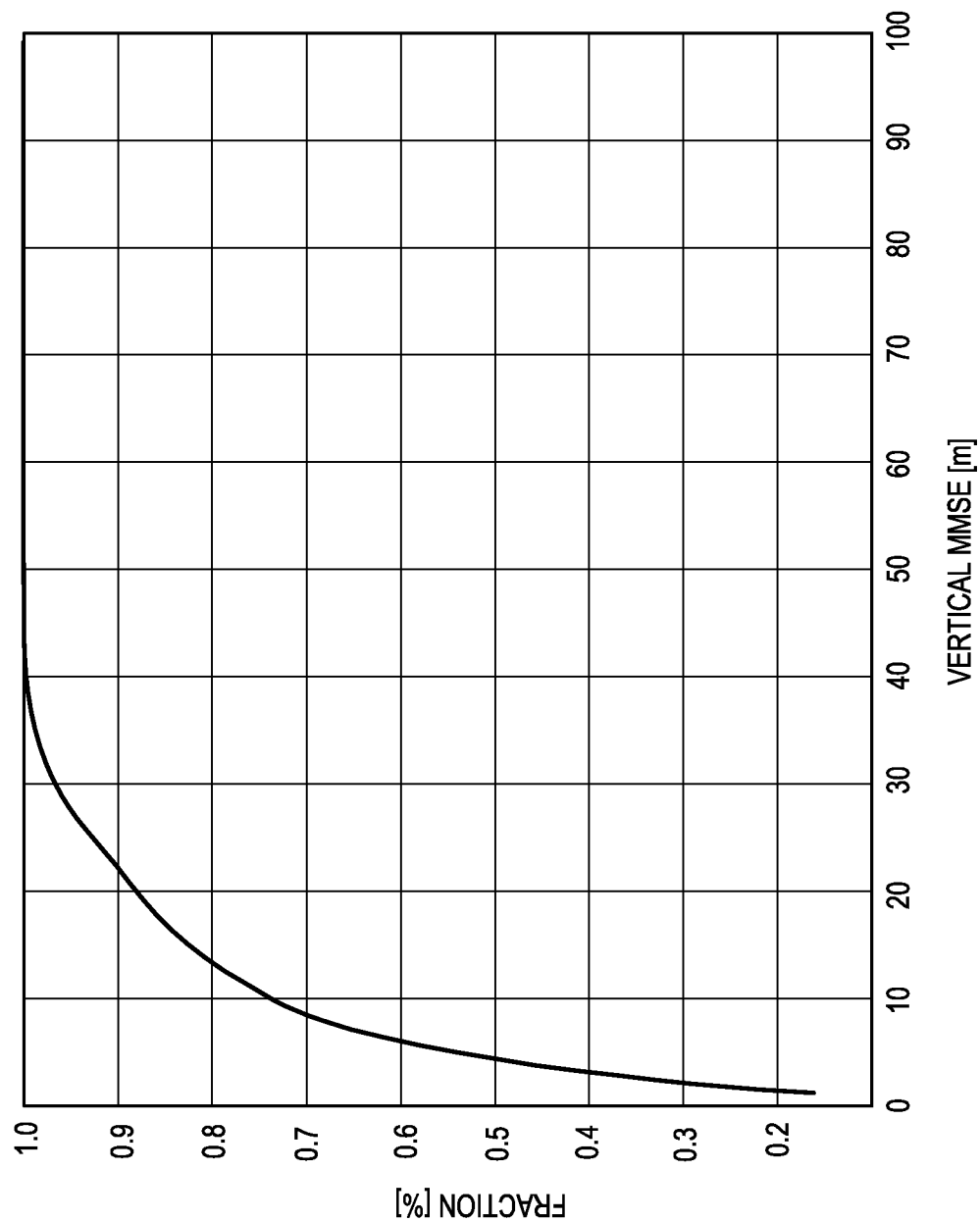

In order to obtain an indication of the accuracy of the proposed method given, a rural 10 cell geometry was set up on the artificial topography of FIG. 8. The topography is intended to model a coastal region, with zero altitude representing the sea level. This represents an additional modeling difficulty, since some of the cells cover both the sea and the hilly terrain. The cells are depicted with overlaid 3D lines. The LS algorithm was then used to compute the 3D surfaces of each cell, applying scaling according to the above description. A simplified approach was used, with horizontal down scaling a factor of 1000 and vertical down scaling a factor of 100. Additional boundary points, centered on the connecting line segments between corners, were used for regularization and the bi-polynomial degrees were selected as $P(j)=Q(j)=3$, $j=1, \ldots, 10$. The promising result is depicted in FIG. 9. To further visualize the performance, vertical errors were computed on a grid covering the topography of FIG. 8. The vertical errors can be obtained directly by a comparison between the true altitude and that obtained by the surface model. The results are depicted in FIG. 10. The statistical result depicted by the Cumulative Distribution Function (CDF) of FIG. 11 was computed only for points in the interior of each polygon. As can be seen, the proposed modeling method is remarkably accurate and reduces the maximal vertical errors by about 80%. For the treated topography the vertical Minimum Mean Square Error (MMSE) is less than 3 meters in almost 50% of the coverage of the cells. This indicates that the Federal Communications Commission (FCC) E-911 positioning requirements can be met by the new method, also in quite difficult scenarios.

II. New TDOA Algorithm

A. The Algorithm

This section describes how the computed 3D surface information can be used to enhance the accuracy of TDOA positioning methods, of which the Uplink TDOA (U-TDOA) method is considered here. TDOA methods are subject to at least two problems. First, additional base stations exceeding the three required for 2D localization and the four required for 3D localization need to be detected to discriminate outliers, e.g., due to Non-Line-Of-Sight (N-LOS) radio propagation. Secondly, the poor Vertical Dilution Of Precision (VDOP) often magnifies vertical measurement errors. The 3D surface model is used to mitigate both problems and/or enabling 3D localization with only three involved sites by formulation of the following optimization problem:

$$\begin{pmatrix} \hat{x}_{UE} \\ \hat{y}_{UE} \end{pmatrix} = \arg\min_{x_{UE}, y_{UE}} V(x_{UE}, y_{UE}),$$

$$V(x_{UE}, y_{UE}) = \sum_{k=1, k \neq r}^{n} \left( OTD_{k,r} - RTD_{k,r} - \frac{1}{c} \left( (x_k - x_{UE})^2 + (y_k - y_{UE})^2 + \left( z_k - \langle z_j \rangle - \sigma_{z,j} f^T \left( \frac{(x_{UE} - \langle x_j \rangle)}{\sigma_{x,j}}, \frac{(y_{UE} - \langle y_j \rangle)}{\sigma_{y,j}} \right) \hat{a}_j \right)^2 \right)^{1/2} \right)$$

Here, $OTD_{k,r}$, $k=1, \ldots, n$, denotes the observed time differences in the mobile device for base station $k=1, \ldots, n$; $RTD_{k,r}$, $k=1, \ldots, n$, denotes the real time (transmission) differences from each base station; $r_k=(x_k\ y_k\ z_k)^T$, $k=1, \ldots, n$ denotes the position vectors of the base stations; $r_{UE}=(x_{UE}\ y_{UE})^T$ denotes the unknown position vector of the mobile device; c denotes the speed of light; and the subscript r denotes the selected reference base station. The above equation thus represents an original criterion for solution of a 3D OTDOA problem, but where the 3D interior surface model is inserted in the criterion to reduce it to an altitude compensated 2D OTDOA problem. With the correct 2D position of the mobile device computed, the altitude follows which results in a complete hybrid 3D OTDOA positioning method. Finally, note that the real time differences are continuously estimated by measurements in Location Measurement Units (LMUs) at surveyed locations as discussed above.

Figure 12:
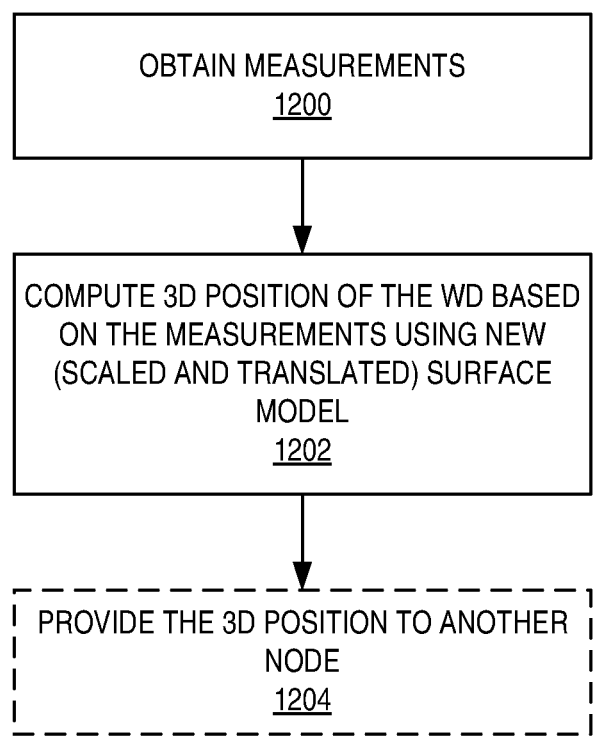
FIG. 12 illustrates a method in accordance with at least some of the embodiments described herein.

FIG. 12 illustrates a method in accordance with at least some of the embodiments described herein. This method may be performed by a positioning node (e.g., E-SMLC in LTE or corresponding positioning node in 5G). As illustrated, measurements are obtained (step 1200). These measurements include observed time differences ($OTD_{k,r}$, $k=1, \ldots, n$) in a wireless device (e.g., a mobile device) for a base station $k=1, \ldots, n$ and real time (transmission) differences ($RTD_{k,r}$, $k=1, \ldots, n$) for each base station $k=1, \ldots, n$.

Next, a 3D position of the wireless device is computed using the new TDOA algorithm, as described above (step 1202). In other words, the 3D position of the wireless device is computed using a TDOA scheme that uses the new (scaled and translated) vertical surface model described herein. As discussed above, the new vertical surface model can be represented as:

$$\hat{z} = f^T(\hat{x}, \hat{y})\hat{a}_j, \ (\hat{x}\ \hat{y}\ 0)^T \in \widetilde{cell}\ j$$

$$z = \langle z_j \rangle + \sigma_{z,j} f^T \left( \frac{x - \langle x_j \rangle}{\sigma_{x,j}}, \frac{y - \langle y_j \rangle}{\sigma_{y,j}} \right) \hat{a}_j, \ (x\ y\ 0)^T \in \text{cell}\ j.$$

Optionally, the 3D position of the wireless device is provided to another node (e.g., step 1204).

B. Performance Illustration

Figure 13:
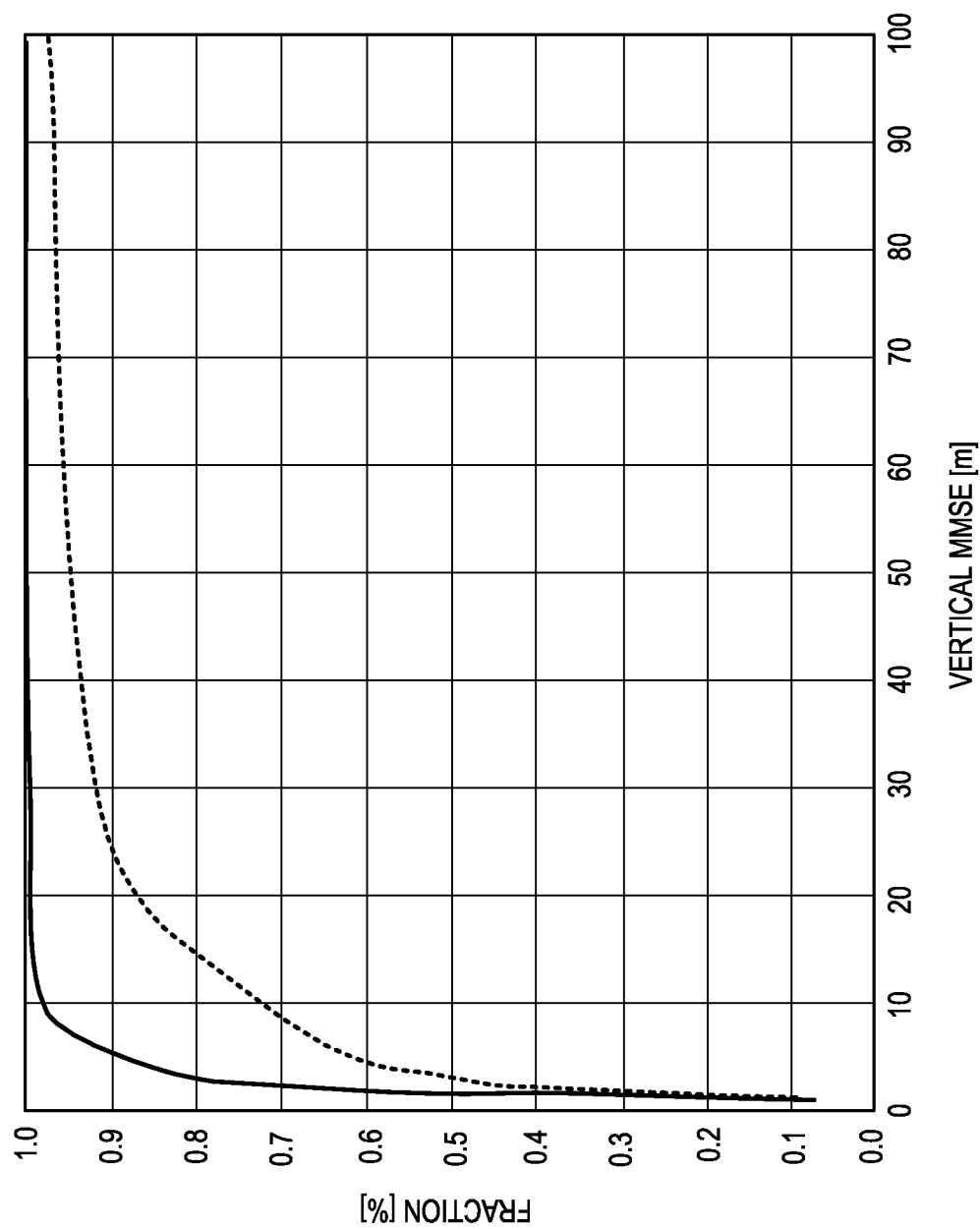
FIG. 13 is an illustration of the performance of one example implementation of the process of FIG. 12.

Vertical errors lead to additional horizontal errors by the coupling introduced by the TDOA equations. To address these errors, the performance of the proposed new scaled TDOA positioning method was evaluated over the same typography as used for the illustration of the surface modeling performance. To assess the performance bound related to the surface modeling, no detections were discarded and measurement error free Line-Of-Sight (LOS) radio propagation was assumed in all cases. The results are plotted in terms of the CDF of FIG. 13, which used a 100 megahertz (MHz) bandwidth and a time resolution of 4e-8 to account for the difference formation of measured TOAs in the UE and of the real time differences.

III. New Architecture Aspects

Figure 14:
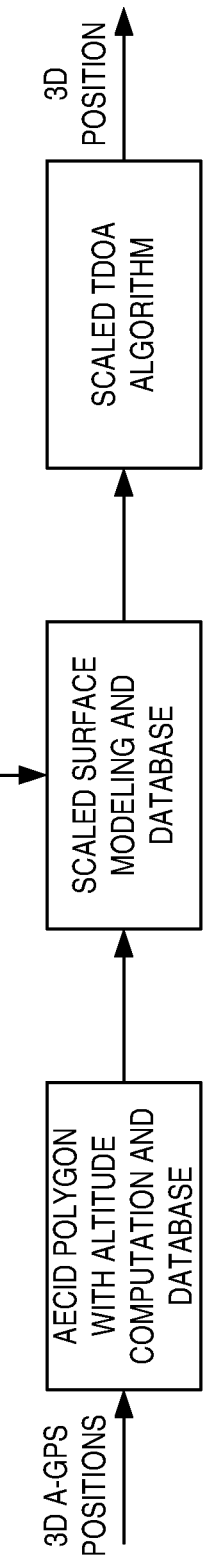
FIG. 14 illustrates new architecture aspects of the present disclosure.

The last characterizing feature of the present disclosure is related to the generation of polygons, where the corners are augmented with altitude information. In prior solutions, GIS systems, i.e. maps, have been assumed to provide this information. The present sections present an architecture that avoids the need for a GIS system by application of the original version of the AECID fingerprinting algorithm. The architecture is depicted in FIG. 14.

The first step is to produce 3GPP polygons with the AECID method. The extension of that method listed above is then used to augment altitude information to each corner of the horizontal polygons, thereby producing the input needed for the surface modeling method of the present disclosure. The augmented polygons are stored and continuously updated in the AECID database. The surface modelling algorithm of the present disclosure may then be run continuously creating surface models that can be stored in a database associated with the AECID database. During the optimization of the scaled TDOA method, the needed surface model parameters including scaling parameters are fetched from the surface model data base and used in the running computation of the UE position estimate.

Note that all this functionality can be performed by the positioning node. In case it shall be distributed, standardization of the signaling over the relevant 3GPP interfaces needs to be in place.

IV. Example Process

Figure 15:
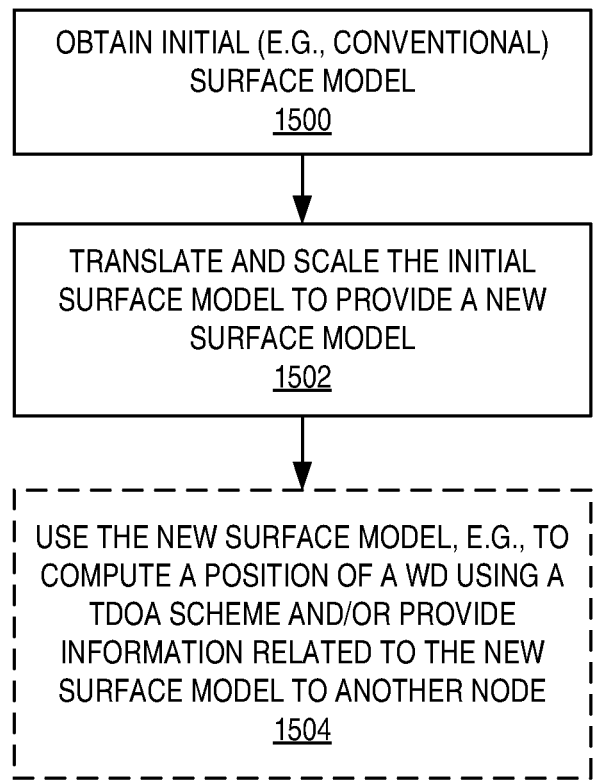
FIG. 15 illustrates a method in accordance with at least some of the embodiments described herein.

FIG. 15 illustrates a method in accordance with at least some of the embodiments described herein. This method may be performed by a positioning node or distributed across two or more network nodes. As illustrated, an initial surface model (e.g., a conventional surface model such as the unscaled surface model described above) is obtained (step 1500). Next, the initial surface model is translated and scaled to provide a new surface model (e.g., the new surface model described above) (step 1502). For example, a change of coordinates for each cell is applied to thereby translate the initial surface model to a situation where the numerical properties are good (e.g., x, y, and z are small), as described above. As described above, in some embodiments, the cells are defined by polygons, and this translation is performed by a subtraction of the 3D mean value of the polygon corners. As described above, this results in the new 3D model, and can be represented as $$\hat{z} = f^T(\tilde{x}, \tilde{y})\hat{a}_i, (\tilde{x}\ \tilde{y}\ 0)^T \in \widetilde{cell}j$$

$$z = \langle z_j \rangle + \sigma_{z,j} f^T\left(\frac{x - \langle x_j \rangle}{\sigma_{x,j}}, \frac{y - \langle y_j \rangle}{\sigma_{y,j}}\right)\hat{a}_i, (x\ y\ 0)^T \in cellj.$$

Optionally, the new surface model is used, e.g., to compute a position of a wireless device using the new TDOA scheme described herein and/or information related to the new surface model is provided to another node (e.g., another network node or the wireless device) (step 1504).

V. Additional Implementation Aspects

Figure 16:
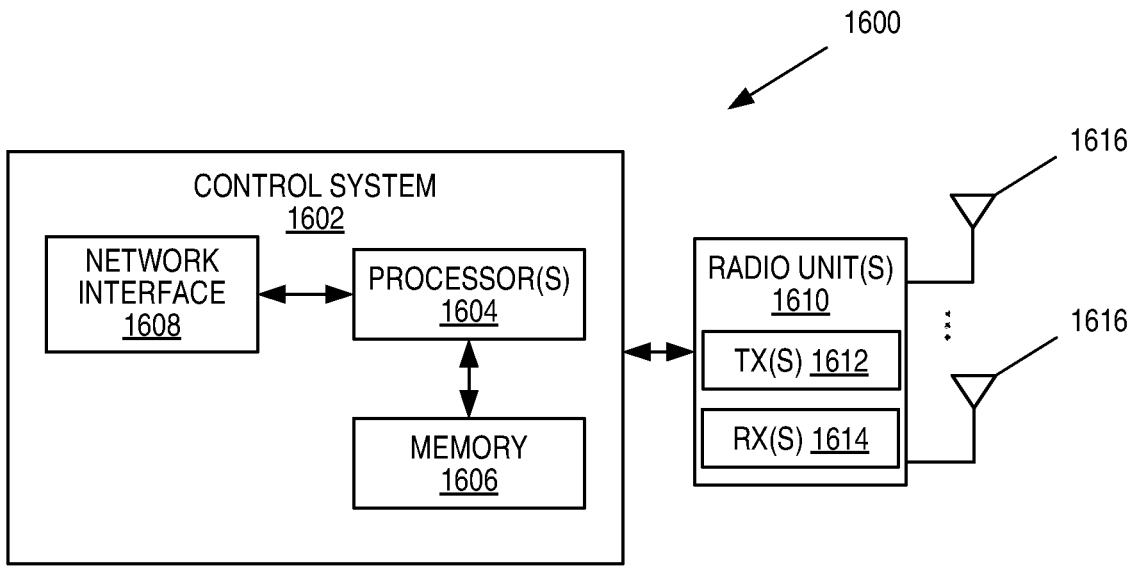
FIGS. 16 through 18 illustrate example embodiments of a radio access node.

FIG. 16 is a schematic block diagram of a radio access node 1600 according to some embodiments of the present disclosure. The radio access node 1600 may be, for example, a base station 702 or 706. As illustrated, the radio access node 1600 includes a control system 1602 that includes one or more processors 1604 (e.g., Central Processing Units (CPUs), Application Specific Integrated Circuits (ASICs), Field Programmable Gate Arrays (FPGAs), and/or the like), memory 1606, and a network interface 1608. In addition, the radio access node 1600 includes one or more radio units 1610 that each includes one or more transmitters 1612 and one or more receivers 1614 coupled to one or more antennas 1616. In some embodiments, the radio unit(s) 1610 is external to the control system 1602 and connected to the control system 1602 via, e.g., a wired connection (e.g., an optical cable). However, in some other embodiments, the radio unit(s) 1610 and potentially the antenna(s) 1616 are integrated together with the control system 1602. The one or more processors 1604 operate to provide one or more functions of a radio access node 1600 as described herein. In some embodiments, the function(s) are implemented in software that is stored, e.g., in the memory 1606 and executed by the one or more processors 1604.

Figure 17:
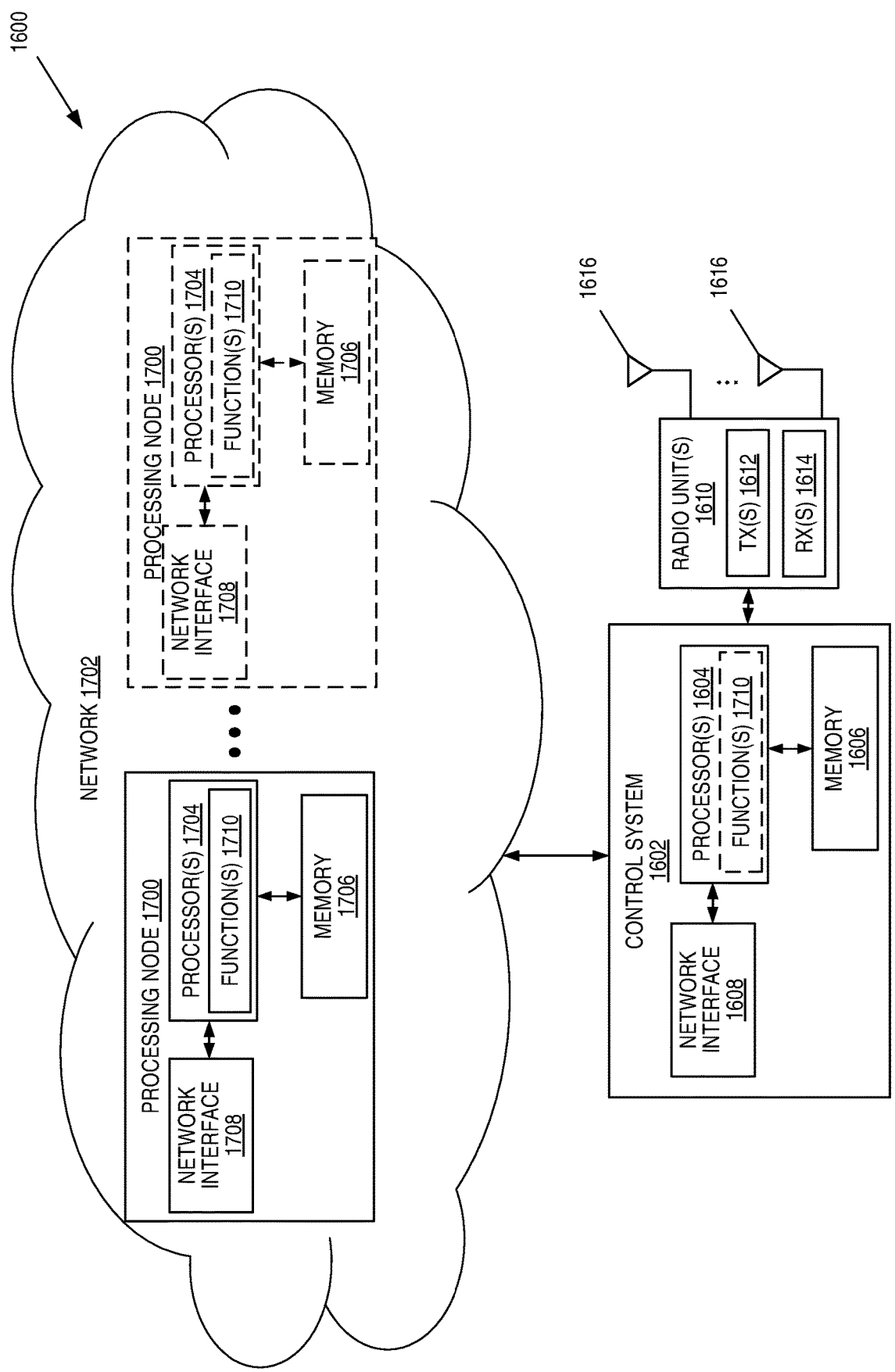

FIG. 17 is a schematic block diagram that illustrates a virtualized embodiment of the radio access node 1600 according to some embodiments of the present disclosure. This discussion is equally applicable to other types of network nodes. Further, other types of network nodes may have similar virtualized architectures.

As used herein, a "virtualized" radio access node is an implementation of the radio access node 1600 in which at least a portion of the functionality of the radio access node 1600 is implemented as a virtual component(s) (e.g., via a virtual machine(s) executing on a physical processing node(s) in a network(s)). As illustrated, in this example, the radio access node 1600 includes the control system 1602 that includes the one or more processors 1604 (e.g., CPUs, ASICs, FPGAs, and/or the like), the memory 1606, and the network interface 1608 and the one or more radio units 1610 that each includes the one or more transmitters 1612 and the one or more receivers 1614 coupled to the one or more antennas 1616, as described above. The control system 1602 is connected to the radio unit(s) 1610 via, for example, an optical cable or the like. The control system 1602 is connected to one or more processing nodes 1700 coupled to or included as part of a network(s) 1702 via the network interface 1608. Each processing node 1700 includes one or more processors 1704 (e.g., CPUs, ASICs, FPGAs, and/or the like), memory 1706, and a network interface 1708.

In this example, functions 1710 of the radio access node 1600 described herein are implemented at the one or more processing nodes 1700 or distributed across the control system 1602 and the one or more processing nodes 1700 in any desired manner. In some particular embodiments, some or all of the functions 1710 of the radio access node 1600 described herein are implemented as virtual components executed by one or more virtual machines implemented in a virtual environment(s) hosted by the processing node(s) 1700. As will be appreciated by one of ordinary skill in the art, additional signaling or communication between the processing node(s) 1700 and the control system 1602 is used in order to carry out at least some of the desired functions 1710. Notably, in some embodiments, the control system 1602 may not be included, in which case the radio unit(s) 1610 communicate directly with the processing node(s) 1700 via an appropriate network interface(s).

In some embodiments, a computer program including instructions which, when executed by at least one processor, causes the at least one processor to carry out the functionality of radio access node 1600 or a node (e.g., a processing node 1700) implementing one or more of the functions 1710 of the radio access node 1600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
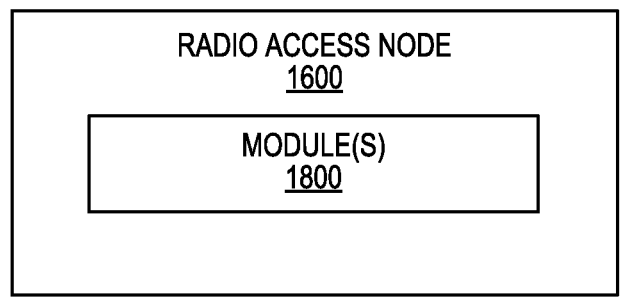

FIG. 18 is a schematic block diagram of the radio access node 1600 according to some other embodiments of the present disclosure. The radio access node 1600 includes one or more modules 1800, each of which is implemented in software. The module(s) 1800 provide the functionality of the radio access node 1600 described herein. This discussion is equally applicable to the processing node 1700 of FIG. 17 where the modules 1800 may be implemented at one of the processing nodes 1700 or distributed across multiple processing nodes 1700 and/or distributed across the processing node(s) 1700 and the control system 1602.

Figure 19:
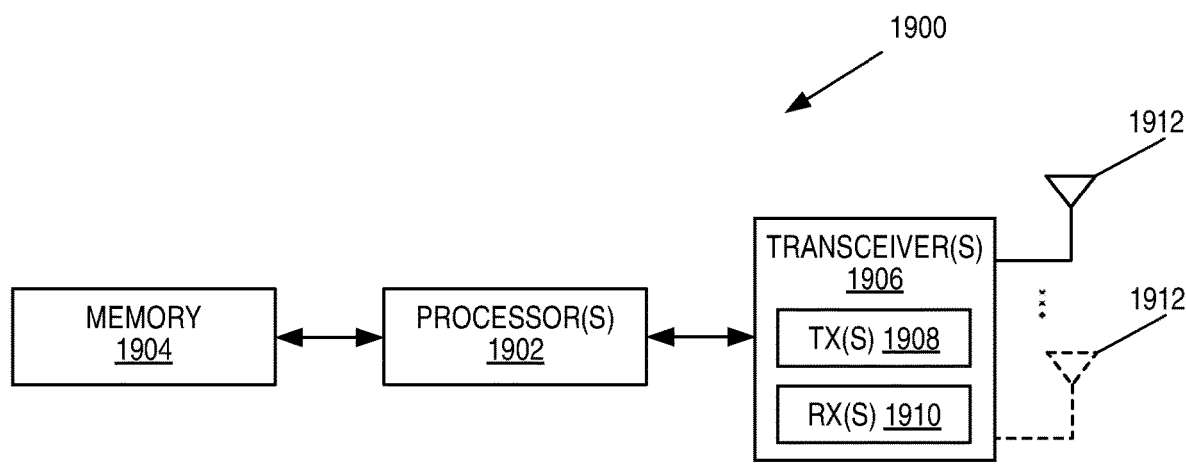
FIGS. 19 and 20 illustrate example embodiments of a User Equipment device (UE).

FIG. 19 is a schematic block diagram of a UE 1900 according to some embodiments of the present disclosure. As illustrated, the UE 1900 includes one or more processors 1902 (e.g., CPUs, ASICs, FPGAs, and/or the like), memory 1904, and one or more transceivers 1906 each including one or more transmitters 1908 and one or more receivers 1910 coupled to one or more antennas 1912. In some embodiments, the functionality of the UE 1900 described above may be fully or partially implemented in software that is, e.g., stored in the memory 1904 and executed by the processor(s) 1902.

In some embodiments, a computer program including instructions which, when executed by at least one processor, causes the at least one processor to carry out the functionality of the UE 1900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
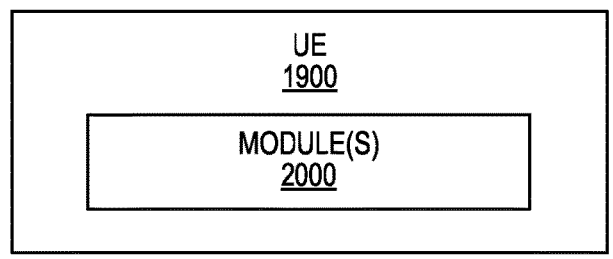

FIG. 20 is a schematic block diagram of the UE 1900 according to some other embodiments of the present disclosure. The UE 1900 includes one or more modules 2000, each of which is implemented in software. The module(s) 2000 provide the functionality of the UE 1900 described herein.

While FIGS. 16 through 20 focus on the radio access node 1600 and the UE 1900, other types of network nodes (e.g., positioning nodes, node implementing a positioning database, etc.) may have a similar architecture. For instance, in general, a network node includes processing circuitry (e.g., similar to the processor(s) of the radio access node 1600 and the UE 1900) configured to cause the network node to perform the functionality of that network node as described herein, e.g., via execution of respective software instructions that are stored in memory. In addition, the network node includes one or more communication interfaces (e.g., a network interface(s) and/or a radio interface(s)). For example, a positioning node (e.g., such as the one that performs the method of FIG. 12, FIG. 14, or FIG. 15) includes processing circuitry that causes the positioning node to perform the disclosed method. The same is true of the other network nodes described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

VI. Example Embodiments

Some example embodiments are as follows.

Embodiment 1: A method for determining a three dimensional location of a wireless device in a cellular communications network, the method comprising: obtaining a plurality of measurements for a wireless device, the plurality of measurements being Time Difference of Arrival, TDOA, related measurements; and computing a three dimensional position of the wireless device using the plurality of measurements and a vertical surface model, wherein the vertical surface model is a translated and scaled version of an initial vertical surface model.

Embodiment 2: The method of embodiment 1 wherein the both the vertical surface model and the initial vertical surface model are models of, for each cell j, altitude, z, at points within an interior of a polygon that represents the cell j.

Embodiment 3: The method of embodiment 2 wherein both the vertical surface model and the initial vertical surface model are based on polygon corners of the polygon in the horizontal plane augmented with vertical information for each corner of the polygon.

Embodiment 4: The method of embodiment 3 wherein the vertical surface model is further based on a translation vector and a scaling matrix.

Embodiment 5: The method of embodiment 4 wherein the vertical surface model is further based on virtual points on three dimensional line segments between the augmented corners of the polygon.

Embodiment 6: The method of any one of embodiments 2 to 5 wherein the vertical surface model is defined as:

$$\hat{z} = f^T(\hat{x}, \hat{y})\hat{\hat{a}}_j, (\hat{x}\ \hat{y}\ 0)^T \in \widetilde{cell}j$$

$$z = \langle z_j \rangle + \sigma_{z,j} f^T\left(\frac{x - \langle x_j \rangle}{\sigma_{x,j}}, \frac{y - \langle y_j \rangle}{\sigma_{y,j}}\right)\hat{a}_i, (x\ y\ 0)^T \in \text{cell}j.$$

Embodiment 7: The method of any one of embodiments 1 to 6 wherein the method is performed by a positioning node.

Embodiment 8: A positioning node in a cellular communications network, the positioning node adapted to perform the method of any one of embodiments 1 to 6.

Embodiment 9: A method for determining a translated and scaled vertical surface model for cells in a cellular communications network, comprising: obtaining an initial vertical surface model for cells in a cellular communications network; and translating and scaling the initial vertical surface model to provide a new vertical surface model.

Embodiment 10: The method of embodiment 9 further comprising using the new vertical surface model.

Embodiment 11: The method of embodiment 10 wherein using the new vertical surface model comprises using the new vertical surface model to compute a three dimensional position of a wireless device.

Embodiment 12: The method of any one of embodiments 9 to 11 wherein the both the new vertical surface model and the initial vertical surface model are models of, for each cell j, altitude, z, at points within an interior of a polygon that represents the cell j.

Embodiment 13: The method of embodiment 12 wherein both the vertical surface model and the initial vertical surface model are based on polygon corners of the polygon in the horizontal plane augmented with vertical information for each corner of the polygon.

Embodiment 14: The method of embodiment 13 wherein translating and scaling the initial vertical surface model to provide the new vertical surface model comprises translating and scaling the initial vertical surface model based on a translation vector and a scaling matrix.

Embodiment 15: The method of embodiment 14 wherein the new vertical surface model is further based on virtual points on three dimensional line segments between the augmented corners of the polygon.

Embodiment 16: The method of any one of embodiments 12 to 15 wherein the new vertical surface model is defined as:

$$\hat{z} = f^T(\hat{x}, \hat{y})\hat{a}_j, (\hat{x}\ \hat{y}\ 0)^T \in \widetilde{cell}j$$

$$z = \langle z_j \rangle + \sigma_{z,j} f^T\left(\frac{x - \langle x_j \rangle}{\sigma_{x,j}}, \frac{y - \langle y_j \rangle}{\sigma_{y,j}}\right)\hat{a}_i, (x\ y\ 0)^T \in \text{cell}\,j.$$

Embodiment 17: The method of any one of embodiments 9 to 16 wherein the method is performed by a positioning node.

Embodiment 18: A positioning node in a cellular communications network, the positioning node adapted to perform the method of any one of embodiments 9 to 16.

At least some of the following abbreviations may be used in this disclosure. If there is an inconsistency between abbreviations, preference should be given to how it is used above. If listed multiple times below, the first listing should be preferred over any subsequent listing(s).

2D Two Dimensional
3D Three Dimensional
3GPP Third Generation Partnership Project
4G Fourth Generation
5G Fifth Generation
AECID Adaptive Enhanced Cell Identity
A-GNSS Assisted Global Navigation Satellite System
A-GPS Assisted Global Positioning System
AoA Angle of Arrival
AP Application Protocol
ASIC Application Specific Integrated Circuit
CDF Cumulative Distribution Function
CID Cell Identity
CPU Central Processing Unit
DSP Digital Signal Processor
E-CID Enhanced Cell Identity (positioning method)
eNB Enhanced or Evolved Node B
E-SMLC Evolved Serving Mobile Location Center
FCC Federal Communications Commission
FPGA Field Programmable Gate Array
GAD Geographical Area Description
GIS Geographical Information System
GLONASS Global Navigation Satellite System
GMLC Gateway Mobile Location Center
gNB New Radio Base Station
GNSS Global Navigation Satellite System
GPS Global Positioning System
ID Identifier
IP Internet Protocol
kHz Kilohertz
LBS Location Based Services
LCS Location Service
LMU Location Measurement Unit
LOS Line-Of-Sight
LPP Long Term Evolution Positioning Protocol
LPPa Long Term Evolution Positioning Protocol Annex
LS Least Squares
LTE Long Term Evolution
MBS Metropolitan Beacon System
MHz Megahertz
MME Mobility Management Entity
MMSE Minimum Mean Square Error
mmw Millimeter Wave
ms Millisecond
MSC Mobile Switching Center
MTC Machine Type Communication
N-LOS Non-Line-Of-Sight
NR New Radio
O&M Operation and Maintenance
OFDM Orthogonal Frequency Division Multiplexing
OFDMA Orthogonal Frequency Division Multiple Access
OTDOA Observed Time Difference of Arrival
P-GW Packet Data Network Gateway
PRS Positioning Reference Signal
PSAP Public Safety Answering Point
RAM Random Access Memory
RAN Radio Access Network
ROM Read Only Memory
RRC Radio Resource Control
RRH Remote Radio Head
SCEF Service Capability Exposure Function
SET Secure User Plane Location Enabled Terminal
SLC Secure User Plane Location Location Center
SLP Secure User Plane Location Location Platform
SON Self-Organizing Network
SPC Secure User Plane Location Positioning Center
SRS Sounding Reference Signal
SUPL Secure User Plane Location
TA Timing Advance
TBS Terrestrial Beacon System
TCP Transmission Control Protocol
TDOA Time Difference of Arrival
TOA Time of Arrival
UE User Equipment
U-TDOA Uplink Time Difference of Arrival
VDOP Vertical Dilution Of Precision
WGS World Geodetic System Those skilled in the art will recognize improvements and modifications to the embodiments of the present disclosure. All such improvements and modifications are considered within the scope of the concepts disclosed herein.

What is claimed is:

1. A method for determining a three dimensional location of a wireless device in a cellular communications network, the method comprising:
    obtaining a plurality of measurements for a wireless device, the plurality of measurements being Time Difference of Arrival, TDOA, related measurements; and
    computing a three dimensional position of the wireless device using the plurality of measurements and a vertical surface model, wherein the vertical surface model is a translated and scaled version of an initial vertical surface model.

2. The method of claim 1 wherein both the vertical surface model and the initial vertical surface model are models of, for each cell j of one or more cells in the cellular communications network, altitude, z, at points within an interior of a polygon that represents the cell j.

3. The method of claim 2 wherein both the vertical surface model and the initial vertical surface model are based on polygon corners of the polygon in the horizontal plane augmented with vertical information for each corner of the polygon.

4. The method of claim 3 wherein the vertical surface model is further based on a translation vector and a scaling matrix.

5. The method of claim 4 wherein the vertical surface model is further based on virtual points on three dimensional line segments between the augmented corners of the polygon.

6. The method of claim 2 wherein the vertical surface model is defined as:

$$\tilde{z} = f^T(\tilde{x}, \tilde{y})\hat{\tilde{d}}_j, (\tilde{x}\tilde{y}0)^T \in \widetilde{\text{cell}}_j$$

where:
- $\tilde{x}$, $\tilde{y}$, and $\tilde{z}$ are a Cartesian x-coordinate, a Cartesian y-coordinate, and an altitude value, respectively, in the translated and scaled version of the initial surface model;
- $f^T(\tilde{x}, \tilde{y})$ is defined as:

$$f(\tilde{x}, \tilde{y}) = (1 \ldots \tilde{y}^{Q(j)} \tilde{x}\tilde{x}\tilde{y} \ldots \tilde{x}\tilde{y}^{Q(j)} \ldots \tilde{x}^{P(j)}\tilde{y}^{Q(j)})^T$$

where P(j) and Q(j) are each a bi-nominal degree;
$\hat{\tilde{d}}_j$ is defined as:

$$\hat{\tilde{d}}_j = \tilde{R}_j^{-1}\tilde{r}_j,$$

$$\tilde{R}_j = \sum_{i=1}^{M(j)} f(\tilde{x}_{i,j}, \tilde{y}_{i,j}) f^T(\tilde{x}_{i,j}, \tilde{y}_{i,j}),$$

$$\tilde{r}_j = \sum_{i=1}^{M(j)} \tilde{z}_{i,j} f(\tilde{x}_{i,j}, \tilde{y}_{i,j})$$

where $\tilde{x}_{i,j}$, $\tilde{y}_{i,j}$, and $\tilde{z}_{i,j}$ are altitude value, respectively, for each i-th scaled polygon corner of the polygon that represents the cell j in the vertical surface model, where:

$$\begin{pmatrix} \tilde{x}_{i,j} \\ \tilde{y}_{i,j} \\ \tilde{z}_{i,j} \end{pmatrix} = \begin{pmatrix} \sigma_{x,j}^{-1} & 0 & 0 \\ 0 & \sigma_{y,j}^{-1} & 0 \\ 0 & 0 & \sigma_{z,j}^{-1} \end{pmatrix} \begin{pmatrix} x_{i,j} - \langle x_j \rangle \\ y_{i,j} - \langle y_j \rangle \\ z_{i,j} - \langle z_j \rangle \end{pmatrix}$$

and:
- $\tilde{x}_{i,j}$ is a Cartesian x-coordinate of the i-th scaled and translated polygon corner of the polygon that represents the cell j in the vertical surface model;
- $\tilde{y}_{i,j}$ is a Cartesian y-coordinate of the i-th scaled and translated polygon corner of the polygon that represents the cell j in the vertical surface model;
- $\tilde{z}_{i,j}$ is an altitude value of the i-th scaled and translated polygon corner of the polygon that represents the cell j in the vertical surface model;
- $x_{i,j}$ is a Cartesian x-coordinate of the i-th polygon corner of the polygon that represents the cell j in the initial vertical surface model;
- $y_{i,j}$ is a Cartesian y-coordinate of the i-th polygon corner of the polygon that represents the cell j in the initial vertical surface model;
- $z_{i,j}$ is an altitude value of the i-th polygon corner of the polygon that represents the cell j in the initial vertical surface model;
- $\langle x_j \rangle$ is a translation value applied to $x_{i,j}$;
- $\langle y_j \rangle$ is a translation value applied to $y_{i,j}$;
- $\langle z_j \rangle$ is a translation value applied to $z_{i,j}$;
- $\sigma_{x,j}^{-1}$ is a scaling factor applied to $x_{i,j}$;
- $\sigma_{y,j}^{-1}$ is a scaling factor applied to $y_{i,j}$; and
- $\sigma_{z,j}^{-1}$ is a scaling factor applied to $z_{i,j}$.

7. The method of claim 6 wherein the translation values and scaling factors are defined as:

$$\begin{pmatrix} \langle x_j \rangle \\ \langle y_j \rangle \\ \langle z_j \rangle \end{pmatrix} = \frac{1}{M(j)} \sum_{i=1}^{M(j)} \begin{pmatrix} x_{i,j} \\ y_{i,j} \\ z_{i,j} \end{pmatrix},$$

$$\sigma_{x,j} = c_x \max_{i_1, i_2} |x_{i_1,j} - x_{i_2,j}|,$$

$$\sigma_{y,j} = c_y \max_{i_1, i_2} |y_{i_1,j} - y_{i_2,j}|, \text{ and}$$

$$\sigma_{z,j} = c_z \max_{i_1, i_2} |z_{i_1,j} - z_{i_2,j}|,$$

where M(j) is a number of polygon corners for the cell j and $c_x$, $c_y$, $c_z$ are scaling constants.

8. The method of claim 1 wherein the method is performed by a positioning node.

9. A positioning node in a cellular communications network, the positioning node comprising:
- a network interface; and
- processing circuitry configured to cause the positioning node to:
  - obtain a plurality of measurements for a wireless device, the plurality of measurements being Time Difference of Arrival, TDOA, related measurements; and
  - compute a three dimensional position of the wireless device using the plurality of measurements and a vertical surface model, wherein the vertical surface model is a translated and scaled version of an initial vertical surface model.

10. A method for determining a translated and scaled vertical surface model for cells in a cellular communications network, comprising:
- obtaining an initial vertical surface model for cells in a cellular communications network; and
- translating and scaling the initial vertical surface model to provide a new vertical surface model,
- wherein both the new vertical surface model and the initial vertical surface model are models of, for each cell j, altitude, z, at points within an interior of a polygon that represents the cell j,
- wherein the new vertical surface model is defined as:

$$\tilde{z} = f^T(\tilde{x}, \tilde{y})\hat{\tilde{d}}_j, (\tilde{x}\tilde{y}0)^T \in \widetilde{\text{cell}}_j$$

where:
- $\tilde{x}$, $\tilde{y}$, and $\tilde{z}$ are a Cartesian x-coordinate, a Cartesian y-coordinate, and an altitude value, respectively, in the new vertical surface model;
- $f^T(\tilde{x}, \tilde{y})$ is defined as:

$$f(\tilde{x}, \tilde{y}) = (1 \ldots \tilde{y}^{Q(j)} \tilde{x}\tilde{x}\tilde{y} \ldots \tilde{x}\tilde{y}^{Q(j)} \ldots \tilde{x}^{P(j)}\tilde{y}^{Q(j)})^T$$

where P(j) and Q(j) are each a bi-nominal degree; and
$\hat{\tilde{d}}_j$ is defined as:

$$\hat{\tilde{d}}_j = \tilde{R}_j^{-1}\tilde{r}_j,$$

$$\tilde{R}_j = \sum_{i=1}^{M(j)} f(\tilde{x}_{i,j}, \tilde{y}_{i,j}) f^T(\tilde{x}_{i,j}, \tilde{y}_{i,j}),$$

$$\tilde{r}_j = \sum_{i=1}^{M(j)} \tilde{z}_{i,j} f(\tilde{x}_{i,j}, \tilde{y}_{i,j})$$

where $\tilde{x}_{i,j}$, $\tilde{y}_{i,j}$, and $\tilde{z}_{i,j}$ are a Cartesian x-coordinate, a Cartesian y-coordinate, and an altitude value, respectively, for each i-th scaled polygon corner of the polygon that represents the cell j in the new vertical surface model, where:

$$\begin{pmatrix} \tilde{x}_{i,j} \\ \tilde{y}_{i,j} \\ \tilde{z}_{i,j} \end{pmatrix} = \begin{pmatrix} \sigma_{x,j}^{-1} & 0 & 0 \\ 0 & \sigma_{y,j}^{-1} & 0 \\ 0 & 0 & \sigma_{z,j}^{-1} \end{pmatrix} \begin{pmatrix} x_{i,j} - \langle x_j \rangle \\ y_{i,j} - \langle y_j \rangle \\ z_{i,j} - \langle z_j \rangle \end{pmatrix}$$

and:
- $\tilde{x}_{i,j}$ is a Cartesian x-coordinate of the i-th scaled and translated polygon corner of the polygon that represents the cell j in the new vertical surface model;
- $\tilde{y}_{i,j}$ is a Cartesian y-coordinate of the i-th scaled and translated polygon corner of the polygon that represents the cell j in the new vertical surface model;
- $\tilde{z}_{i,j}$ is an altitude value of the i-th scaled and translated polygon corner of the polygon that represents the cell j in the new vertical surface model;
- $x_{i,j}$ is a Cartesian x-coordinate of the i-th polygon corner of the polygon that represents the cell j in the initial vertical surface model;
- $y_{i,j}$ is a Cartesian y-coordinate of the i-th polygon corner of the polygon that represents the cell j in the initial vertical surface model;
- $z_{i,j}$ is an altitude value of the i-th polygon corner of the polygon that represents the cell j in the initial vertical surface model;
- $\langle x_j \rangle$ is a translation value applied to $x_{i,j}$;
- $\langle y_j \rangle$ is a translation value applied to $y_{i,j}$;
- $\langle z_j \rangle$ is a translation value applied to $z_{i,j}$;
- $\sigma_{x,j}^{-1}$ is a scaling factor applied to $x_{i,j}$;
- $\sigma_{y,j}^{-1}$ is a scaling factor applied to $y_{i,j}$; and
- $\sigma_{z,j}^{-1}$ is a scaling factor applied to $z_{i,j}$.

11. The method of claim 10 wherein the translation values and scaling factors are defined as:

$$\begin{pmatrix} \langle x_j \rangle \\ \langle y_j \rangle \\ \langle z_j \rangle \end{pmatrix} = \frac{1}{M(j)} \sum_{i=1}^{M(j)} \begin{pmatrix} x_{i,j} \\ y_{i,j} \\ z_{i,j} \end{pmatrix},$$

$$\sigma_{x,j} = c_x \max_{i_1, i_2} |x_{i_1,j} - x_{i_2,j}|,$$

$$\sigma_{y,j} = c_y \max_{i_1, i_2} |y_{i_1,j} - y_{i_2,j}|, \text{ and}$$

$$\sigma_{z,j} = c_z \max_{i_1, i_2} |z_{i_1,j} - z_{i_2,j}|,$$

where M(j) is a number of polygon corners for the cell j and $c_x$, $c_y$, $c_z$ are scaling constants.

* * * * *